(12) United States Patent
Rice

(10) Patent No.: US 12,147,205 B2
(45) Date of Patent: Nov. 19, 2024

(54) SYSTEM AND METHOD FOR PROPERTY SECURITY

(71) Applicant: Imprenditore Pty Ltd., Sydney (AU)

(72) Inventor: Patrick Jeremy Rice, Brisbane (AU)

(73) Assignee: Imprenditore Pty Ltd., Sydney (AU)

( * ) Notice: Subject to any disclaimer, the term of this patent is extended or adjusted under 35 U.S.C. 154(b) by 0 days.

(21) Appl. No.: 18/223,339

(22) Filed: Jul. 18, 2023

(65) Prior Publication Data

US 2024/0019822 A1 Jan. 18, 2024

Related U.S. Application Data

(63) Continuation-in-part of application No. 18/106,464, filed on Feb. 6, 2023, now Pat. No. 12,050,445, which
(Continued)

(30) Foreign Application Priority Data

Jul. 12, 2006 (AU) .................. 2006903740
May 4, 2007 (AU) .................. 2007902358

(51) Int. Cl.
*G06F 15/173* (2006.01)
*G05B 15/02* (2006.01)
(Continued)

(52) U.S. Cl.
CPC .......... *G05B 15/02* (2013.01); *G06F 11/3089* (2013.01); *G06F 21/6218* (2013.01);
(Continued)

(58) Field of Classification Search
CPC . G05B 15/02; G06F 11/3089; G06F 21/6218; H04B 7/1851; H04L 67/025; H04L 67/12; Y04S 40/18
(Continued)

(56) References Cited

U.S. PATENT DOCUMENTS

| | | | |
|---|---|---|---|
| 4,621,263 | A | 11/1986 | Takenaka et al. |
| 5,708,964 | A | 1/1998 | Meger et al. |

(Continued)

FOREIGN PATENT DOCUMENTS

| | | |
|---|---|---|
| CA | 2624186 A1 | 4/2007 |
| JP | 03071297 A | 3/1991 |

(Continued)

OTHER PUBLICATIONS

International Search Report issued on Jul. 21, 1999 for PCT/US98/25407.
Written Opinion issued on Aug. 19, 2008 for PCT/AU2007/000958.

*Primary Examiner* — Alicia Baturay
(74) *Attorney, Agent, or Firm* — Burdick Patents, P.A.; Sean D. Burdick

(57) ABSTRACT

A system for providing property security includes servers configured to communicate in real time or near real-time over a Wide Area Network with a local signaling device associated with a physical property. The servers are further configured to register the local signaling device associated with the physical property to utilize functions provided by third party monitoring services that are communicatively coupled to the local signaling device. The registration includes configuring, at least in part, through user data entry into a web-based interface, a set of predefined steps to be taken by the servers in connection with the functions provided by the third-party monitoring services. The servers are further configured to receive a security signal from the local signaling device, and in response to receiving said security signal, execute the predefined steps. The execution includes communicating instructions to the third-party monitoring services mapped to one or more end-user devices.

14 Claims, 43 Drawing Sheets

Related U.S. Application Data is a continuation of application No. 17/099,330, filed on Nov. 16, 2020, now abandoned, which is a continuation of application No. 16/417,265, filed on May 20, 2019, now Pat. No. 10,866,570, which is a continuation of application No. 14/667,903, filed on Mar. 25, 2015, now Pat. No. 10,295,967, which is a continuation of application No. 13/846,531, filed on Mar. 18, 2013, now abandoned, which is a continuation of application No. 12/373,506, filed as application No. PCT/AU2007/000958 on Jul. 12, 2007, now Pat. No. 8,446,276.

(51) Int. Cl.
| | | |
|---|---|---|
| G06F 11/30 | (2006.01) | |
| G06F 21/62 | (2013.01) | |
| H04B 7/185 | (2006.01) | |
| H04L 67/025 | (2022.01) | |
| H04L 67/12 | (2022.01) | |

(52) U.S. Cl.
CPC ......... *H04B 7/1851* (2013.01); *H04L 67/025* (2013.01); *H04L 67/12* (2013.01); *Y04S 40/18* (2018.05)

(58) Field of Classification Search
USPC ........................................................ 709/223
See application file for complete search history.

(56) References Cited

U.S. PATENT DOCUMENTS

| | | | |
|---|---|---|---|
| 5,845,230 A | 12/1998 | Lamberson | |
| 5,907,279 A | 5/1999 | Bruins et al. | |
| 5,933,080 A | 8/1999 | Nojima | |
| 6,026,165 A | 2/2000 | Marino et al. | |
| 6,239,700 B1 | 5/2001 | Hoffman et al. | |
| 6,437,692 B1 | 8/2002 | Petite et al. | |
| 6,526,442 B1 | 2/2003 | Stupek, Jr. et al. | |
| 6,553,336 B1 | 4/2003 | Johnson et al. | |
| 6,580,950 B1 | 6/2003 | Johnson et al. | |
| 6,693,530 B1 | 2/2004 | Dowens et al. | |
| 6,788,200 B1 | 9/2004 | Jamel et al. | |
| 6,795,823 B1 | 9/2004 | Aklepi et al. | |
| 6,924,727 B2 | 8/2005 | Nagaoka et al. | |
| 6,935,959 B2 | 8/2005 | Danieli et al. | |
| 6,943,682 B1 | 9/2005 | Dowens et al. | |
| 6,982,656 B1 | 1/2006 | Coppinger et al. | |
| 7,079,027 B2 | 7/2006 | Wojcik | |
| 7,102,493 B1 | 9/2006 | Coppinger et al. | |
| 7,113,090 B1 | 9/2006 | Saylor et al. | |
| 7,213,061 B1 | 5/2007 | Hite et al. | |
| 7,248,161 B2 | 7/2007 | Spoltore et al. | |
| 7,319,412 B1 | 1/2008 | Coppinger et al. | |
| 7,348,882 B2 | 3/2008 | Adamczyk et al. | |
| 7,403,116 B2 | 7/2008 | Bittner | |
| 7,526,539 B1 | 4/2009 | Hsu | |
| 7,555,528 B2 | 6/2009 | Rezvani et al. | |
| 7,685,465 B1 | 3/2010 | Shaw et al. | |
| 7,746,224 B2 | 6/2010 | Addy | |
| 7,747,898 B1 | 6/2010 | Shaw et al. | |
| 7,760,109 B2 | 7/2010 | Broad et al. | |
| 7,849,152 B2* | 12/2010 | Anipindi | H04N 21/6587 709/228 |
| 8,020,104 B2 | 9/2011 | Robarts et al. | |
| 8,446,276 B2* | 5/2013 | Rice | H04B 7/1851 709/224 |
| 8,615,216 B2* | 12/2013 | Rajguru | H04W 12/08 455/410 |
| 8,744,523 B2* | 6/2014 | Fan | H04M 11/025 340/541 |
| 8,903,521 B2* | 12/2014 | Goree | A63B 69/3632 700/90 |
| 8,923,919 B2* | 12/2014 | Fan | H04N 21/64322 340/541 |
| 9,064,392 B2* | 6/2015 | Lee | H04M 1/72418 |
| 9,716,675 B2* | 7/2017 | Choi | H04L 12/2816 |
| 10,295,967 B2* | 5/2019 | Rice | H04L 67/025 |
| 10,551,801 B2* | 2/2020 | Rice | G05B 11/012 |
| 10,866,570 B2* | 12/2020 | Rice | G06F 21/6218 |
| 10,991,188 B2* | 4/2021 | Woo | G08B 13/1618 |
| 11,189,153 B1* | 11/2021 | Faszold | G08B 21/182 |
| 11,706,100 B2* | 7/2023 | Poteat | H04L 41/16 709/224 |
| 11,706,586 B2 | 7/2023 | Carraway | |
| 11,910,279 B2 | 2/2024 | Wu et al. | |
| 11,921,831 B2* | 3/2024 | Khadloya | G06F 21/32 |
| 2002/0021231 A1 | 2/2002 | Schlager et al. | |
| 2002/0080025 A1 | 6/2002 | Beattie | |
| 2002/0180579 A1 | 12/2002 | Nagaoka et al. | |
| 2003/0012344 A1 | 1/2003 | Agarwal et al. | |
| 2003/0069002 A1 | 4/2003 | Hunter et al. | |
| 2003/0076369 A1 | 4/2003 | Resner et al. | |
| 2003/0117280 A1 | 6/2003 | Prehn | |
| 2003/0221004 A1 | 11/2003 | Stupek et al. | |
| 2003/0229559 A1 | 12/2003 | Panttaja et al. | |
| 2004/0004547 A1 | 1/2004 | Appelt et al. | |
| 2004/0059815 A1 | 3/2004 | Buckingham et al. | |
| 2004/0145471 A1 | 7/2004 | Lawrenson et al. | |
| 2004/0201471 A1 | 10/2004 | Primm et al. | |
| 2004/0202154 A1 | 10/2004 | Aklepi et al. | |
| 2005/0124318 A1 | 6/2005 | Jeon | |
| 2005/0128080 A1 | 6/2005 | Hall et al. | |
| 2005/0128295 A1 | 6/2005 | Addy | |
| 2005/0131551 A1* | 6/2005 | Ruutu | G05B 15/02 700/20 |
| 2005/0159905 A1 | 7/2005 | Bond et al. | |
| 2005/0198121 A1 | 9/2005 | Daniels et al. | |
| 2005/0216302 A1 | 9/2005 | Raji et al. | |
| 2005/0235058 A1 | 10/2005 | Rackus et al. | |
| 2005/0275549 A1 | 12/2005 | Barclay et al. | |
| 2006/0027677 A1 | 2/2006 | Abts | |
| 2006/0047360 A1 | 3/2006 | Burns et al. | |
| 2006/0202819 A1 | 9/2006 | Adamczyk et al. | |
| 2006/0253598 A1 | 11/2006 | Nakamura et al. | |
| 2007/0046459 A1 | 3/2007 | Silverman et al. | |
| 2007/0073708 A1 | 3/2007 | Smith et al. | |
| 2007/0194914 A1 | 8/2007 | Gates | |
| 2008/0224848 A1 | 9/2008 | Meyer | |
| 2008/0287109 A1 | 11/2008 | Marett et al. | |
| 2010/0115093 A1 | 5/2010 | Rice | |
| 2012/0127980 A1* | 5/2012 | Quinn | H04W 8/005 370/338 |
| 2012/0157037 A1 | 6/2012 | Hoffman et al. | |
| 2014/0059393 A1* | 2/2014 | Rice | G06F 21/6218 714/47.3 |
| 2014/0167983 A1* | 6/2014 | Rude | H04Q 9/00 340/870.07 |
| 2015/0019018 A1 | 1/2015 | Rice | |
| 2015/0261198 A1* | 9/2015 | Rice | H04B 7/1851 700/83 |
| 2018/0196398 A1 | 7/2018 | Rice | |
| 2021/0097311 A1* | 4/2021 | McBeth | H04W 4/80 |
| 2021/0181699 A1* | 6/2021 | Rice | G06F 11/3089 |
| 2021/0273957 A1* | 9/2021 | Boyer | H04L 63/1416 |
| 2021/0380014 A1 | 12/2021 | Hishida et al. | |
| 2023/0297045 A1* | 9/2023 | Rice | G06F 21/86 700/83 |
| 2024/0019822 A1* | 1/2024 | Rice | G06F 11/3089 |

FOREIGN PATENT DOCUMENTS

| | | |
|---|---|---|
| JP | 2002190871 A | 7/2002 |
| JP | 2002230670 B | 8/2002 |
| JP | 2003027530 B | 1/2003 |
| JP | 2003085677 A | 3/2003 |
| JP | 2004007444 A | 1/2004 |
| JP | 2004240574 A | 8/2004 |
| JP | 2006003931 A | 1/2006 |
| JP | 2006089021 B | 4/2006 |
| WO | 9706499 A1 | 2/1997 |

(56) References Cited

FOREIGN PATENT DOCUMENTS

| WO | 9735432 A1 | 9/1997 |
| WO | 0033049 A1 | 6/2000 |
| WO | 0033070 A1 | 6/2000 |
| WO | 0072183 A2 | 11/2000 |
| WO | 2003088508 A2 | 10/2003 |
| WO | 2006036807 A2 | 4/2006 |
| WO | 2007038515 A2 | 4/2007 |

* cited by examiner

Scenario Three Cars

Modern cars have devices for collecting an enormous variety of data, all of which is brought back to a central source within the car.

Attach an ISU at this point and a new vista opens up:

| Source | Data collected | Use for Data |
|---|---|---|
| Odometer Data | | 1: Hire car monitoring and charging<br>2: Trip monitoring and log books<br>3: Car servicing |
| Petrol consumption Data | | 1: Hire car monitoring and charging<br>2: Trip monitoring<br><br>Petrol consumption data could be used to compare relative petrol used by different models of cars and drivers |
| Performance data | - Water and oil levels<br>- Water and oil temperatures | 1: Car servicing<br>2: Hire car monitoring and charging |
| Speedo data | - Detect the fact that a car is being driven<br>- Detect rapid deceleration and acceleration<br>- Detect speeding | 1: Hire car monitoring and charging<br>2: Detect the car has been stolen<br>2: Detect car accident and calculate its seriousness |

Fig. 21

Function  Scenario two | Cars

| Source | Data collected | Use for Data |
|---|---|---|
| Door lock status | | 1: Car stolen<br>Lock or deadlock car<br>2: Car left unlocked<br>Algorithms could be used to suggest that the car has been left unattended and unlocked and/or without the ISU security system enabled<br>3: Keys lost<br>If an owner loses their keys and they are worried about the finder of the keys gaining access to their car they could SMS ISU to lock the car and not respond to efforts to unlock it until instructed otherwise via the ISU network. |
| In car computing and entertainment | | An ISU can provide internet access which can be used for:<br>• Configuring the ISU<br>• Downloading music and videos<br>• Gaining access to a home computer<br>• Surfing – booking accommodation for the rest of the trip, viewing maps<br>• Email collection |
| Add action devices Data | • Car immobilisation<br>• Car horn | 1: Car stolen<br>• Immobilise car<br>• Car frightening sequence – sound alarm, sound recorded on entertainment system, sound car horn and flash lights |
| Store information | • Download on demand | 1: Hire car monitoring and charging<br>2: Remote servicing<br>Data on the operation of a car can be relayed to a mechanic who can then provide advice and instructions for repair of the car. This could be very important for breakdowns in remote country |

Fig. 22

Scenario Three Cars

| Potential Use | ISU role | |
|---|---|---|
| | Measure | Control |
| Notification of unauthorised use | Doors open, windows broken, car started (with or without key), lock status | Alarm, warning to owner and/or security firm, immobilization device |
| Recover stolen vehicles | Location – triangulation | Information to owner and/or security firm |
| Road accident early notification | Shocks, speed, deceleration | Information to owner and/or security firm |
| Damage to stationary vehicle – e.g. in car park | Shocks | Information to owner |
| Improve Taxi Driver safety | Duress alarm, location – triangulation | Information to head office and/or security firm |
| Reliable log books | Ignition on and off, triangulation of location, time | Store data for RTA inspection |
| Emission control – carbon credits, government control, fuel efficiency | Exhaust composition | Store data for later inspection, motor adjustment |
| Reduce mistreatment of vehicles | Speedometer – speeds, acceleration, deceleration, rpm | Routine download for inspection by hire firm |
| Locate a broken down or crashed vehicle | Location – triangulation | Information to Road Service firm |
| Regular servicing notification | Odometer | Inform service firms and owner |
| Notification when user maintenance is required | Water and oil levels, water and oil temperatures | Inform owner |
| Prevent dangerous cabin situations | Movement in cabin and cabin temperature | Inform owner |

Fig. 23

Scenario Three   Cars | Car Servicing | Registration

ISU Web site - user setting up the car-servicing module for their car ISU

| Potential Use | New Products | ISU Friendly Sites | Service Links | Pricing | Contact |

MONITOR ANYTHING, ANYWHERE, ANYTIME.

ISU car-servicing registration

| Service Companies | Performance service options |

You have selected the following three service companies to provide quotes for your regular car services. Performance scores are average improvement in engine performance. Satisfaction scores indicate how satisfied people have been with their service.

| Companies | ISU Score out of 10 | |
|---|---|---|
| Fred's Audi | Performance: 8 | Satisfaction: 7 |
| John Brown Mechanic | Performance: 9 | Satisfaction: 6 |
| Agatha's Full Car Servicing | Performance: 6 | Satisfaction: 6.5 |

Scenario Three  Cars | Car Servicing | Registration

ISU Web site – user setting up the car-servicing module for their car ISU

| Potential Use | View Products | ISU Friendly Sites | Service Links | Pricing | Contact |

MONITOR ANYTHING, ANYWHERE, ANYTIME.

ISU car-servicing registration

| Service Companies | Performance service options |

Please select which of the following you would like to be monitored o your car.

☐ Pollution monitoring – increasing pollution from your car not only harms the environment but also indicates a poorly functioning car.

☐ Oil/water and charge warnings

☐ Performance metrics

☐ Regular service timings

Fig. 25

Scenario Three  Car Servicing | Servicing

When the Odometer reaches the Target Mileage:

SMS/email to 3 Car Mechanics:
"ISU Car Service Monitoring: The Audi XYZ belonging to Joe Smith is now due for a 20,000 km service. Please reply with a quote and the next three available appointment times available for providing this service."

After receiving the replies the following would be sent to the owner:
"ISU Car Service Monitoring: Your Audi XYZ is now due for a 20,000km service and the following prices and available appointment times have been provided:"

| Reply | Company Name | Quote | Dates available |
|---|---|---|---|
| 1 | Fred's Audi | $150.00 | Monday 2 July – Wednesday 5 July |
| 2 | John Brown Mechanic | $120.00 | Thursday 5 July, Monday 10, Tuesday 11 |
| 3 | Agatha's Full Car Servicing | $250.00 | Anytime – anything for you babe |

Fig. 26

Scenario Three  Car Servicing | Servicing

ISU marketing to servicing providers

Information displayed by service providers on ISU website.

| Potential Use | New Products | ISU Friendly Sites | Service Links | Pricing | Contact |

MONITOR ANYTHING, ANYWHERE, ANYTIME.

ISU providers registration

Service Companies | Performance service options

Specialties

Name:
Address:
Phone:
Mobile 1:
Mobile 2:
Email:
Web:

Makes: < Select from list >

Service:
Exhaust
Engine Reconditioning
Regularize Checks
Transmission

Sales Comment (less than 50 words)

Fig. 27

Scenario Three   Car | Car Servicing | Servicing

ISU pricing to car servicing providers

| Promotion categories | Price ($ per month) |
|---|---|
| Inclusion on site | $100.00 |
| Top three of list | extra $1000.00 |
| Include in default list | extra $1500 |
| Opportunity to quote on all services | extra $2000.00 |
| First page | extra $200 |
| Access to web page | extra $0.50 per click |
| Alternatively, let ISU choose your promotion in return for a 15% commission on all accepted quotes | |

Fig. 28

SYSTEM AND METHOD FOR PROPERTY SECURITY

CROSS-REFERENCE TO RELATED APPLICATIONS/INCORPORATION BY REFERENCE

This patent application makes reference to, claims priority to, claims the benefit of, and is a Continuation-in-part of U.S. patent application Ser. No. 18/106,464, filed Feb. 6, 2023, which is a Continuation application of U.S. patent application Ser. No. 17/099,330, filed Nov. 16, 2020, which is a Continuation application of U.S. patent application Ser. No. 16/417,265, filed May 20, 2019, which is a Continuation application of U.S. patent application Ser. No. 14/667,903, filed Mar. 25, 2015, which is a Continuation application of Ser. No. 13/846,531, filed Mar. 18, 2013, which is a Continuation application of U.S. patent application Ser. No. 12/373,506, filed Jan. 12, 2009, and which is the National Stage Entry of PCT/AU07/00958 filed Jul. 12, 2007.

The above referenced applications are hereby incorporated herein by reference in their entirety.

FIELD OF TECHNOLOGY

The present disclosure relates generally to property security, and more specifically, to a system and a method for providing property security.

BACKGROUND

The efficient functioning of modern societies relies on innumerable discrete items of infrastructure. In many cases, particularly where such items are located in remote or difficult to reach or monitor locations, a malfunction or adverse incident may remain undetected for considerable lengths of time causing inconvenience, economic loss or even potentially hazardous situations.

Regular inspection of many such items of infrastructure in remote areas, for example irrigation sluices, gates, stock watering troughs etc. is usually impractical. Similar impracticality or prohibitive expense is associated with the monitoring for example of such items as tool sheds at building sites, tool boxes on trucks, and equipment and plant remaining on construction sites etc.

The need for monitoring is of course not restricted to remote areas. Security and status of equipment, buildings and vehicles and the like is important everywhere. However, setting up a monitoring system is frequently a complicated procedure, often involving complex wiring of hardware installations, site visits by professional personnel.

It is an object of the present invention to address or at least ameliorate some of the above disadvantages.

Further limitations and disadvantages of conventional and traditional approaches will become apparent to one of skill in the art through comparison of such systems with some aspects of the present disclosure, as set forth in the remainder of the present application with reference to the drawings.

BRIEF SUMMARY OF THE DISCLOSURE

A system and method for providing property security, substantially as shown in and/or described in connection with at least one of the figures, as set forth more completely in the claims.

The system and the method may enhance security by providing real-time monitoring of security signals from various sensors and devices and analyzing the security signals using an AI-based analysis model. Thus, the system and the method may allow for a detection of security threats and events more quickly and accurately than traditional known security systems. The system and the method may improve access control by allowing data owners to provision or deny access control to other entities without exposing their data to other users, including administrators of a web-based platform. The system and the method may be scalable and able to handle large amounts of data from multiple sensors and devices. The security signals and other data associated with a plurality of security events of the local signaling device and other local signaling devices are stored in private data silos. The use of private data silos for each local signaling device may also increase scalability by preventing data overload. The system and the method may provide customizable insights based on the specific needs and preferences of the user. A plurality of supplementary insights and security patterns determined by one or more servers may allow for the generation of unique insights tailored to the user's needs. The use of private data silos for each local signaling device may help ensure data privacy by keeping data associated with a specific device or user separate from other users and administrators of the web-based platform.

These and other advantages, aspects and novel features of the present disclosure, as well as details of an illustrated embodiment thereof, will be more fully understood from the following description and drawings.

BRIEF DESCRIPTION OF DRAWINGS

FIGS. 13 to 16 are further pages of the web site of FIGS. 6 to 12, for configuring of an individual signal unit, FIGS. 17 to 19 are further pages of the web site adapted to allow an owner or authorized person to access data collected by an individual signal unit, FIGS. 21 to 23 show a variety of applications and functions of an ISU installed in a vehicle, including the interfacing of the ISU with the onboard computer of the vehicle, FIGS. 24 and 25 show two pages of a possible web site for registering aspects of a vehicle's performance monitoring and servicing arrangements, FIG. 26 shows the interactions facilitated by means of an in-vehicle ISU for arranging servicing of the vehicle, FIG. 27 shows a web page provided by a central control facility for registration of vehicle service providers who are willing to provide services to vehicles equipped with an ISU, FIG. 28 shows an example of revenue streams which may be derived from vehicle service providers who register with the central control facility.

DETAILED DESCRIPTION OF THE DISCLOSURE

Figure 1:
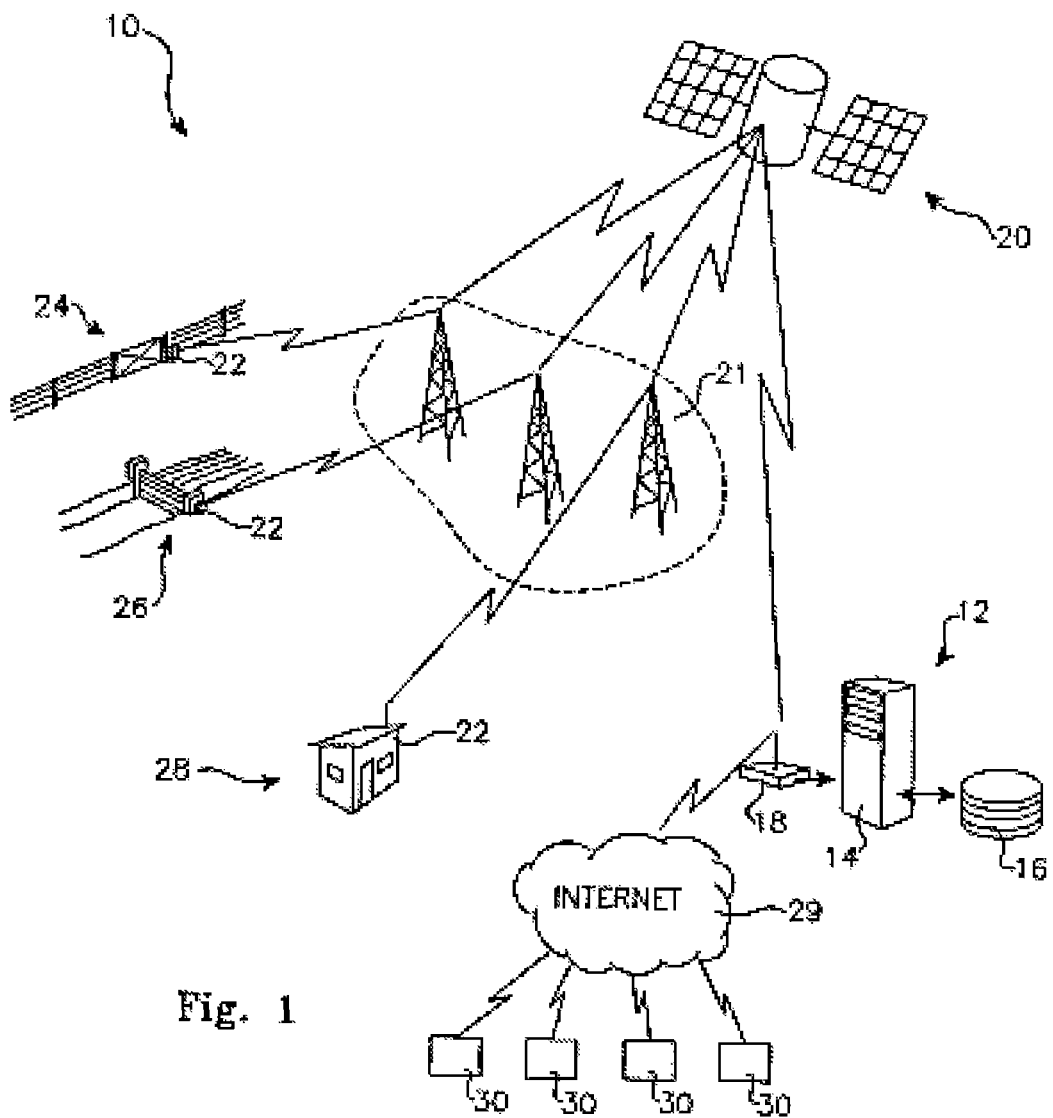
FIG. 1, is a representation of a preferred arrangement of communication between apparatus and users of a monitoring system according to the invention.

FIG. 1 is a diagrammatic representation of the apparatus and connections included in a monitoring system according to a preferred embodiment of the invention. A central control facility 12 includes a data processing server 14 and data storage 16, linked to a transceiver 18. Central control facility 12 is in radio communication with a communication network such as a mobile phone network, or for example as shown in FIG. 1, with at least one communication satellite 20, by means of transceiver 18.

In the example of a communication satellite 20, it in turn, is in telecommunication contact with a number of individual signal units 22, for example via the Global System for Mobile Communications (GSM), the General Packet Radio Service (GPRS) or a similar communication network 21. Individual signal units 22 belong to registered users of the system and may be located anywhere within the signal footprint of a communication satellite (or satellites) 20, or of some other communication network.

Figure 3:
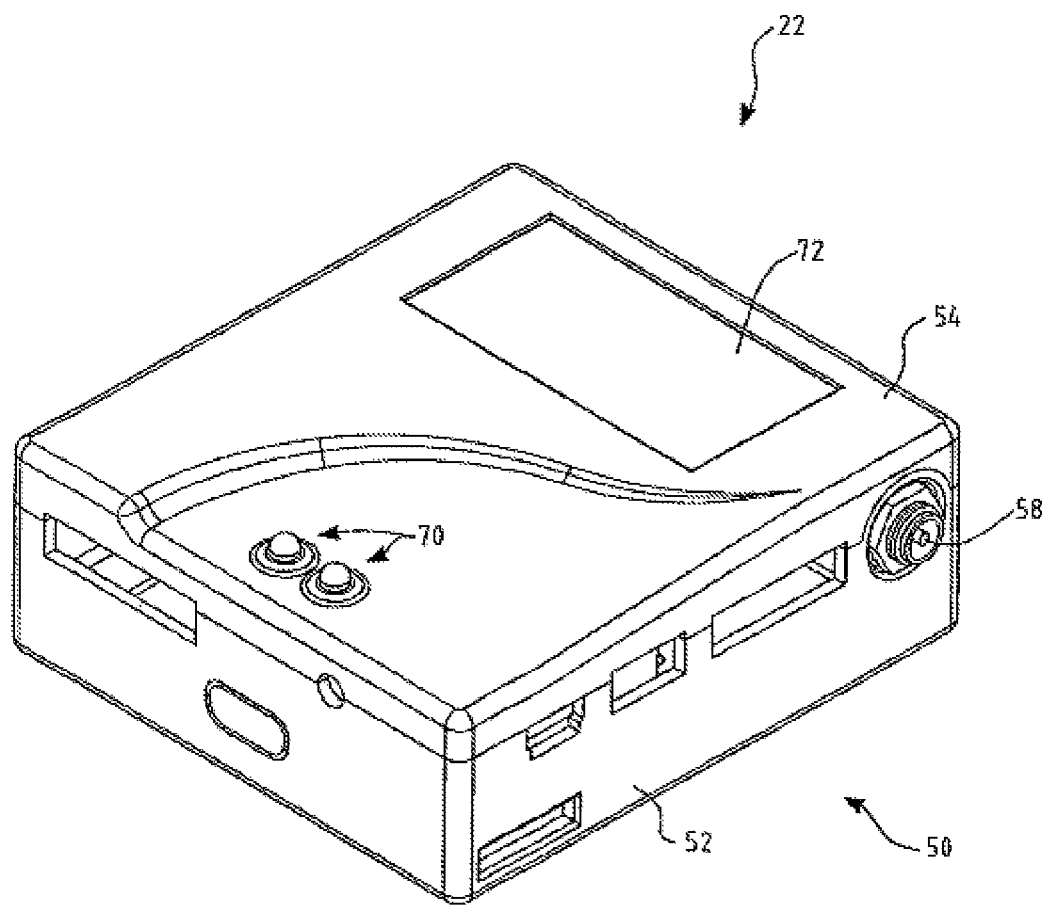
FIG. 3 is a perspective view of a preferred enclosure for an individual signal unit according to the invention.

Individual signal units 22 each are assigned a unique identifying code, and may take a number of physical configurations depending on the environment in which they are to be located. FIG. 3 shows one preferred form of an individual signal unit, comprising enclosure 50 with various input and output devices. In some preferred forms at least, they will comprise a rugged, moisture and tamper-proof outer casing with internal power supply and a selection of bracketry and other attachment means for affixing the devices to a variety of structures and surfaces. In other preferred forms the device may be incorporated in an item of equipment at manufacture, for example in the lantern structure of street lights.

Figure 4:
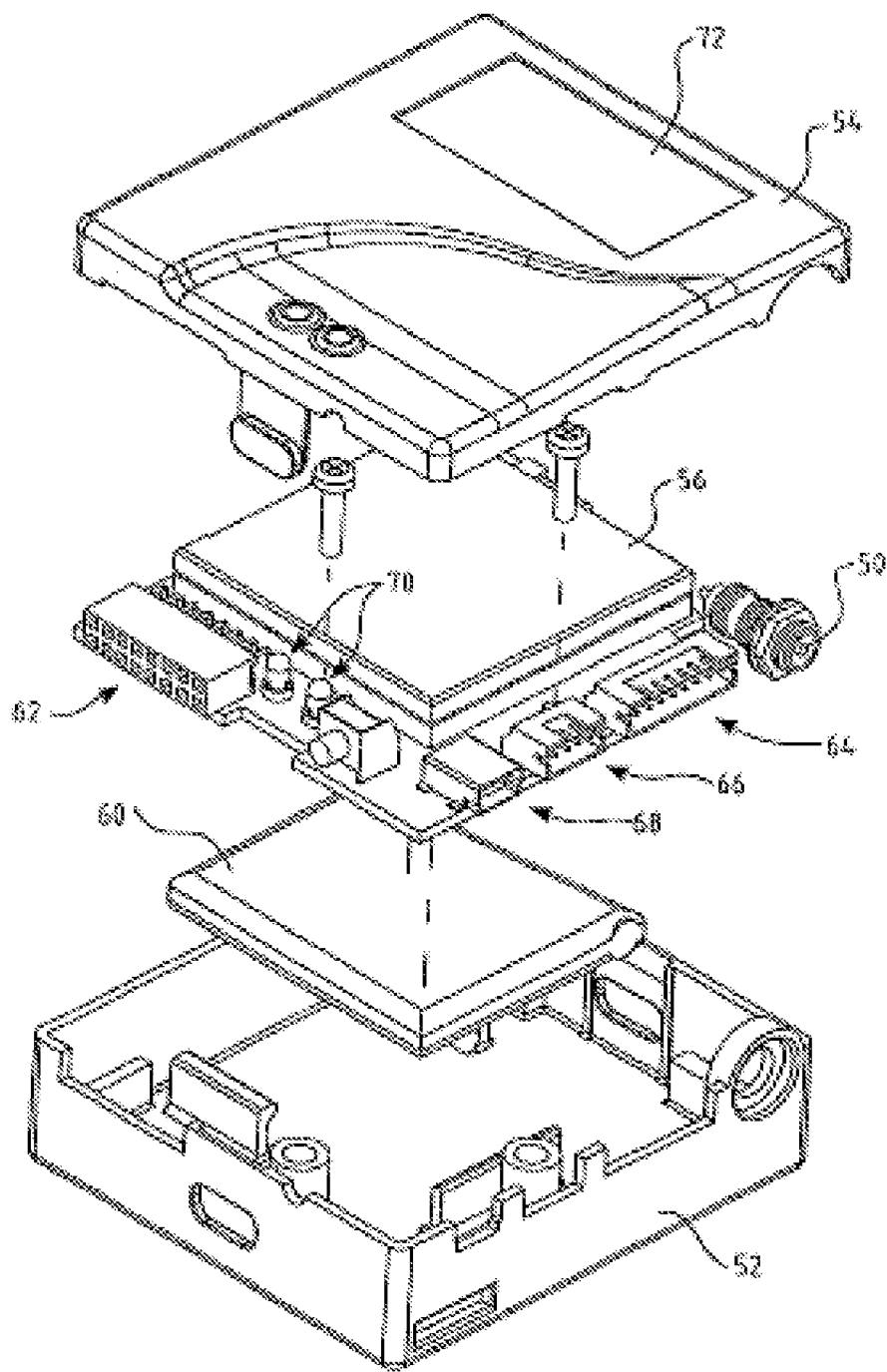
FIG. 4 is an exploded perspective view of the enclosure of FIG. 3 showing principle internal components of one embodiment of an individual signal unit.

With reference to FIG. 4 which shows an exploded view of one preferred form of an individual signal unit 22, enclosure 50 comprises a base portion 52 and cover portion 54. Housed within enclosure 50 are a communication module 56, for example using the General Packet Radio Service (GPRS) standard for communication with a communication network, and antenna jack 58. Also contained within enclosure 50 is a rechargeable battery module 60, and various input and output connections, including power input/outputs 62, sensor inputs 64, device relay connections 66 and a universal serial bus (USB port) 68. Individual signal unit 22 may also be provided with status indicating light emitting diodes (LEDs) 70. Enclosure 50 is provided with a space, for example space 72 on cover 54, for display of a code used in the registration of the unit with the central control facility.

Each individual signal unit 22 is adapted to monitor the status of some aspect of an item of infrastructure, such as for example illustrated in FIG. 1, a gate 22, irrigation control sluice 24 or tool shed 26.

Figure 2:
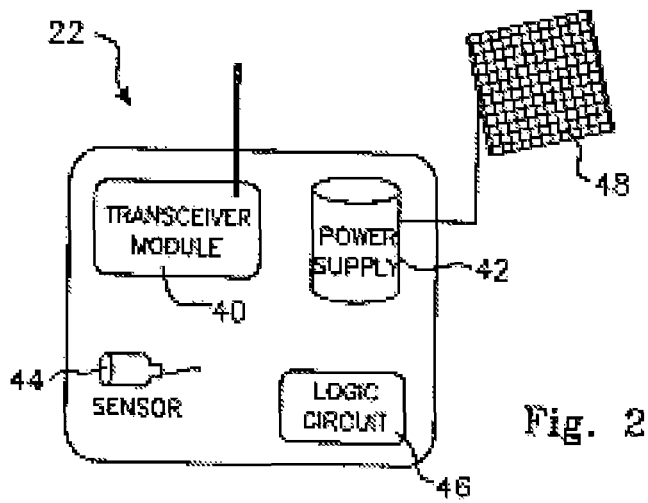
FIG. 2, is a schematic of a preferred embodiment of an individual signal unit (ISU) of the arrangement of FIG. 1.

As shown in the schematic of FIG. 2, individual signal units 22 include at least a transceiver module 40, a rechargeable power supply and power control module 42, at least one external event sensor 44 and a logic circuit 46. For some applications, an individual signal unit may be provided with, or connected to, a magnetic card reader, enabling inspecting personnel to simply swipe an authorising card as confirmation that the individual signal unit is in its proper position and functioning, or that some predefined task has been accomplished.

Preferably, the power supply 42 is rechargeable by means of a solar panel 48, but may also comprise batteries rechargeable from a mains power source, or replaceable battery packs. Where an individual signal unit has been incorporated in some item of infrastructure already provided with a power supply, such as in the street light example, power to the unit may be provided from that external supply.

An individual signal unit 22 may be provided with at least one external event sensor 44 incorporated within the device itself, but individual signal units 22 are more preferably provided with a sensor interface allowing the unit to accept signals from a number of external event sensors connected to the interface. Thus, for example, an individual signal unit 22 may monitor a number of aspects of a remotely located facility, such as the doors and windows of a building or various items of equipment located on a service vehicle.

With reference to FIGS. 5A to 5H, the ISU may include the following components. GSM Engine 74.

This is the central core of the device. It includes a GSM transceiver allowing (enabling) the module to connect to and communicate over the GSM network. The transceiver also makes use of the GPRS capability of the GSM network to connect to a server of the central control facility using IP sockets. The GSM engine also includes a basic Python script interpreter to run application scripts (software) and a battery charger 75 to allow (enable) the charging of a Li-ion battery pack (connected via J5 on the circuit diagram of FIG. 5C).

The application scripts (software) loaded into the GSM engine 74 allow the module to monitor the external sensors and devices connected to the ISU device and generate messages over the GPRS network to the central control facility server whenever there is a change in the status of these external sensors or devices. The typical operation will be for the GSM engine to connect to a known IP socket on a server at a known IP address. The message passed to the server via this connection will include the identification of the ISU device (typically the 'phone number associated with the SIM card) and the details of the input status change.

The GSM engine has a push button switch (S1 on the circuit diagram of FIG. 5C) which allows the GSM engine to be turned on and off.

Figure 5A:
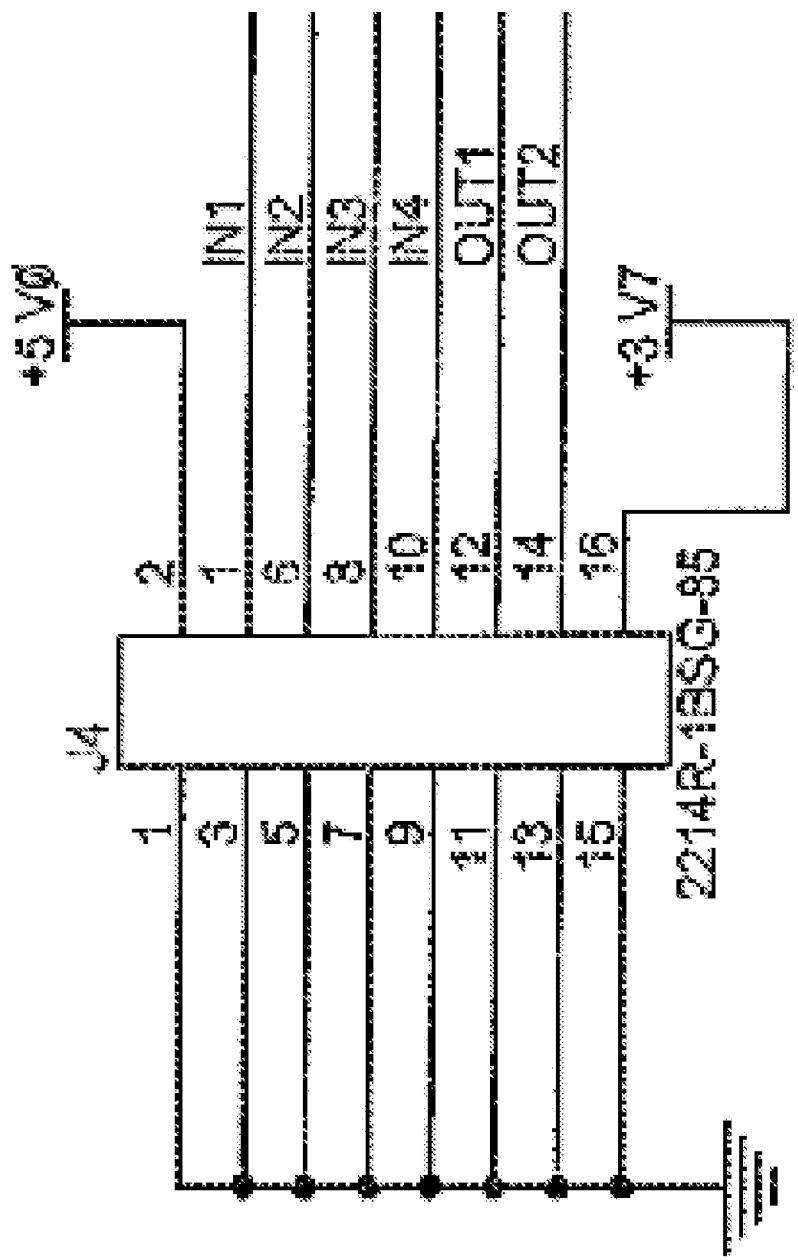
FIGS. 5A to 5H are enlarged partial views of a circuit diagram of an embodiment of an individual signal unit.
Figure 5B:
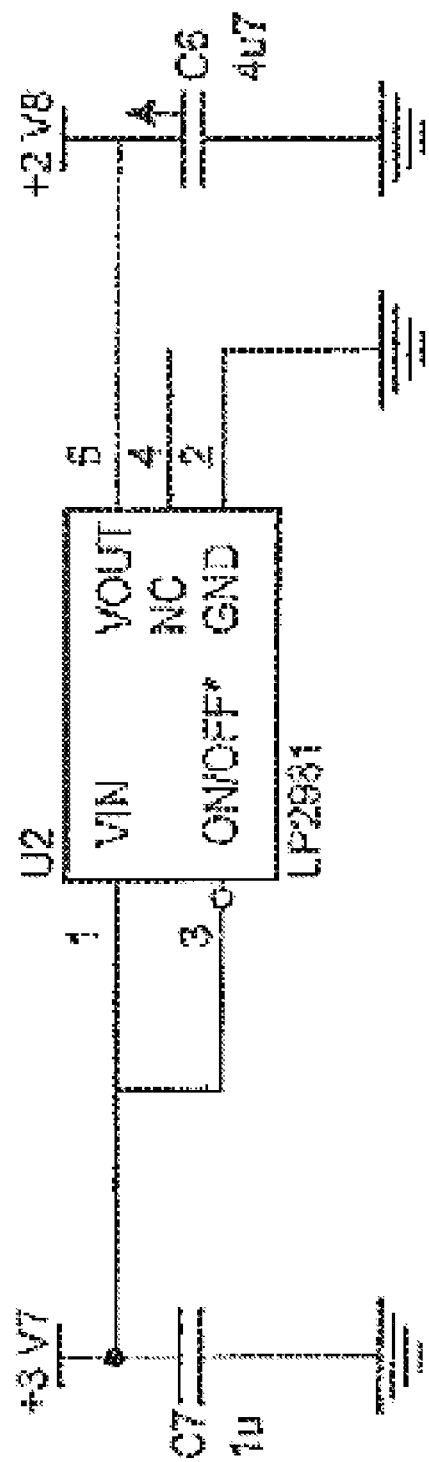
Figure 5C:
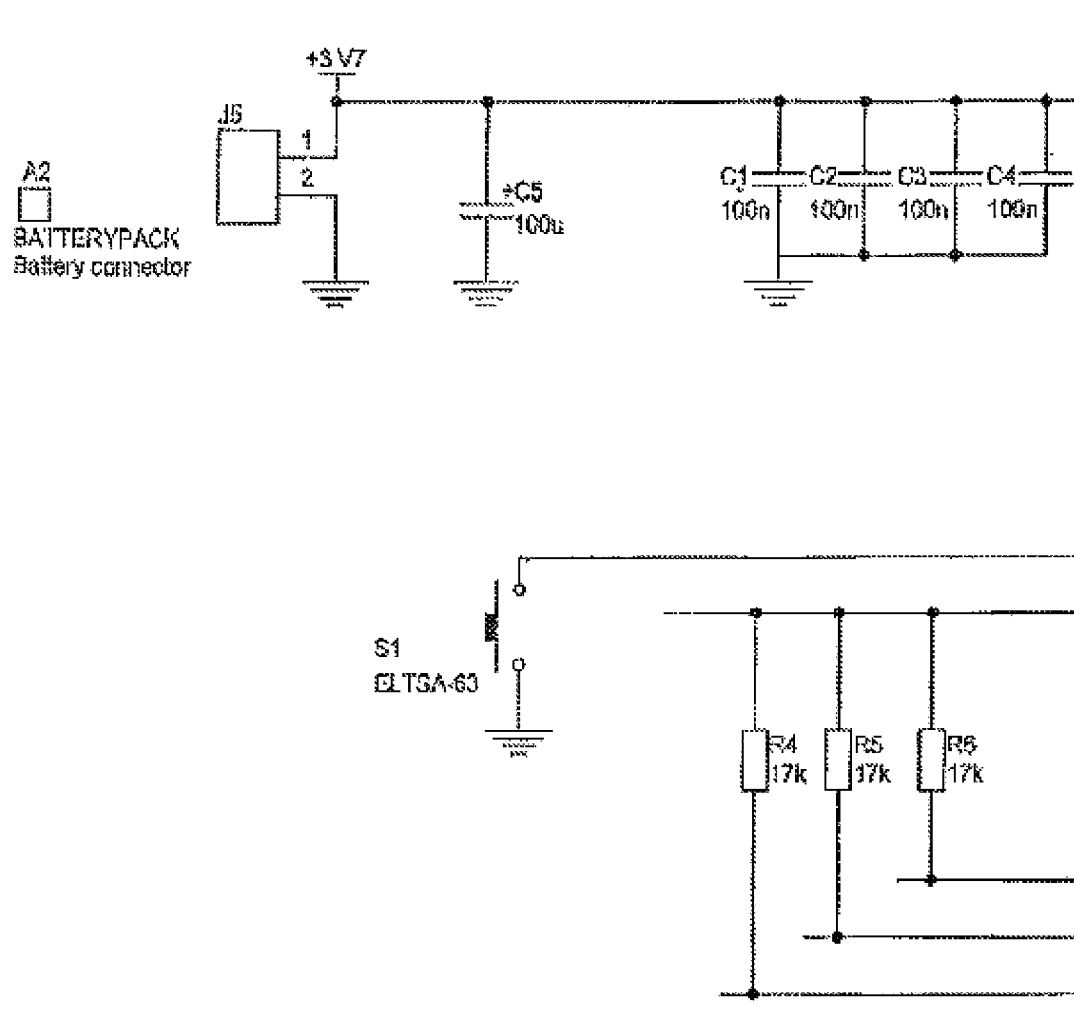
Figure 5D:
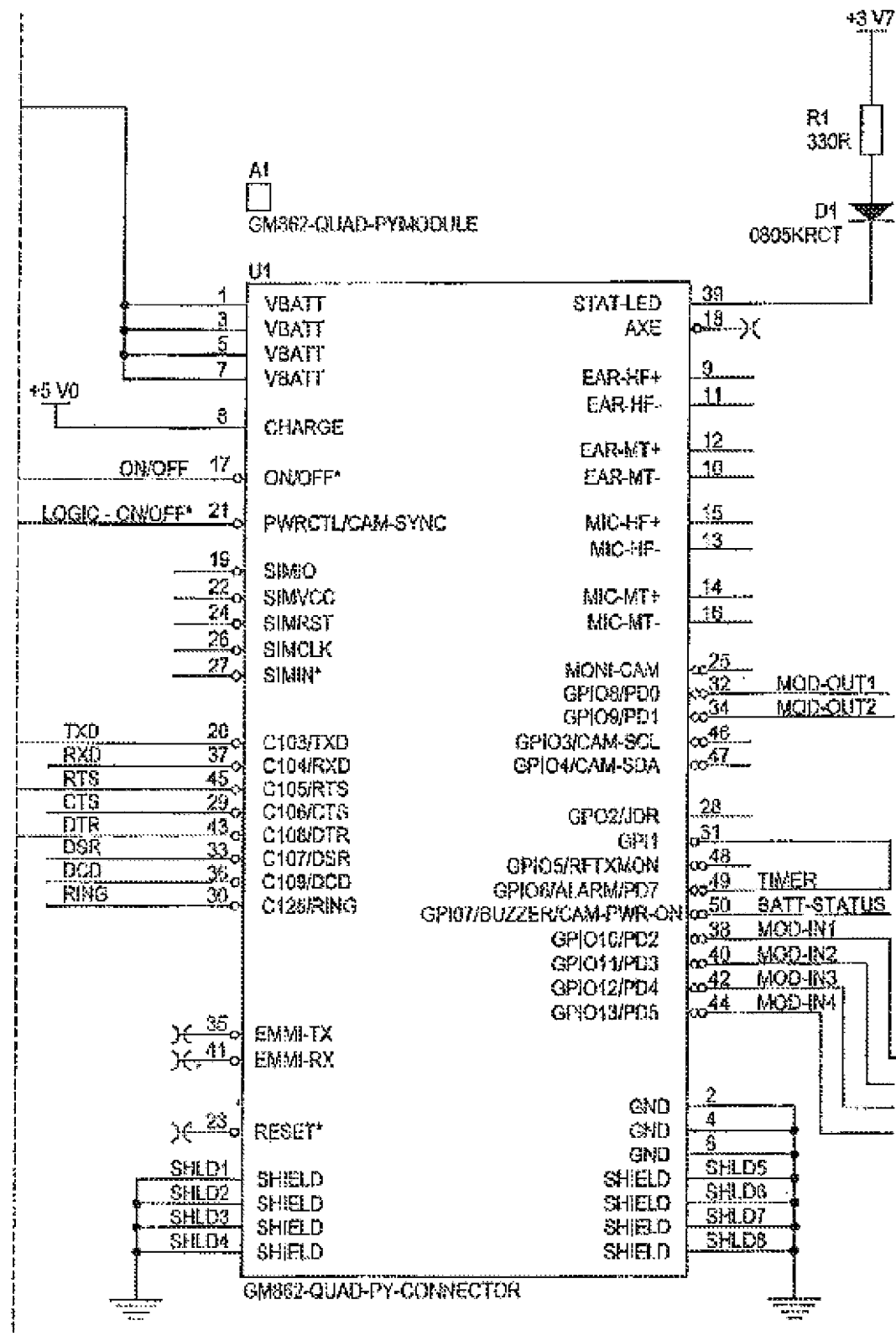
Figure 5E:
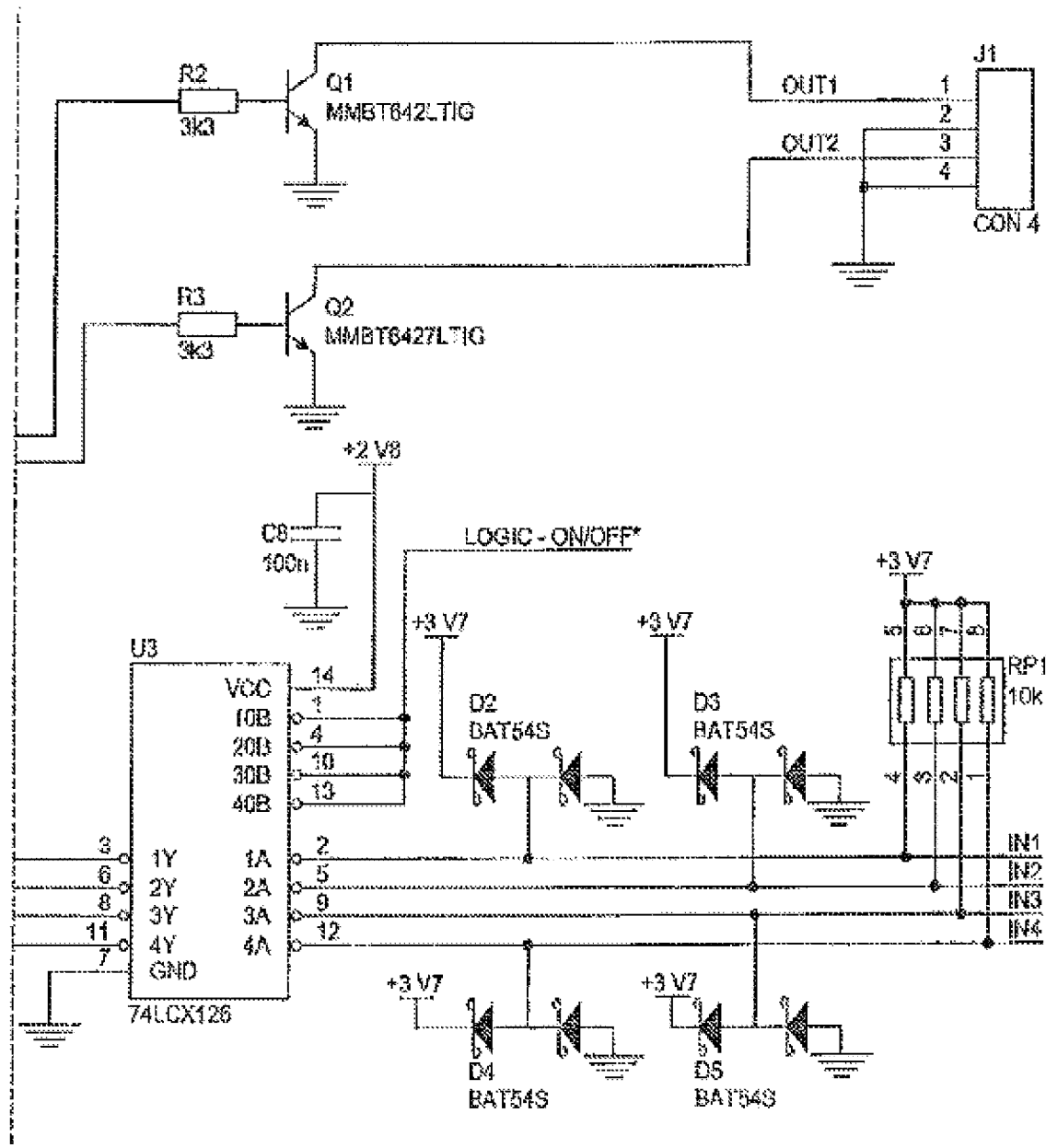

Network Status Indicator (D1 on Circuit Diagram of FIG. 5D)

An LED (light emitting diode) is provided to give an indication of the status of the ISU device. When the LED is permanently off, the device is powered down. When the LED is blinking quickly (approximately 1 second period), the GSM engine is searching for the GSM network and attempting to register itself with the network. When the LED is blinking slowly (approximately 3 second period), the GSM engine has registered itself with the GSM network and is in a state that will allow it to make a connection with a server should one of the inputs change state. When the LED is permanently on, there is an active call being made by the device.

Figure 5F:
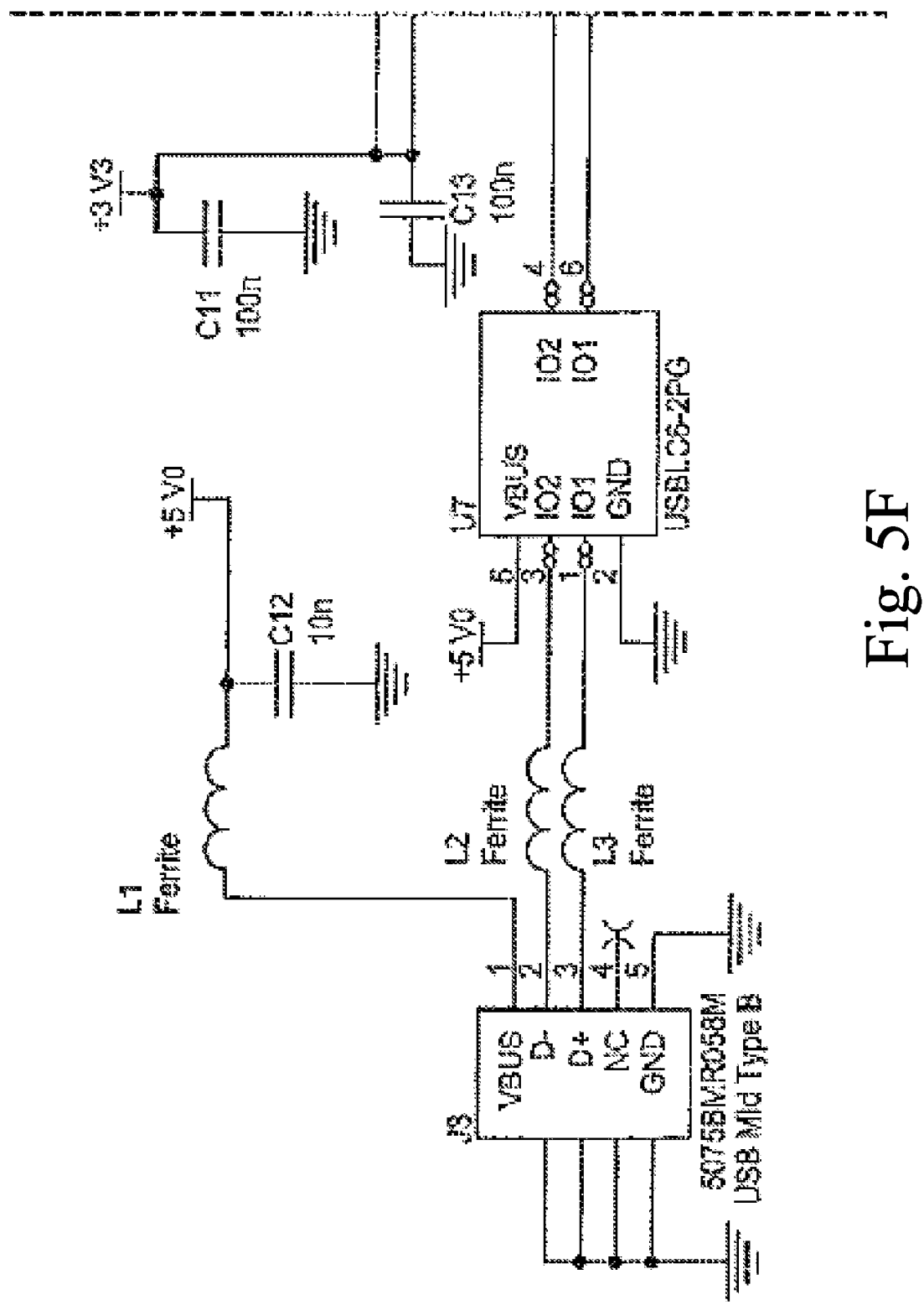
Figure 5G:
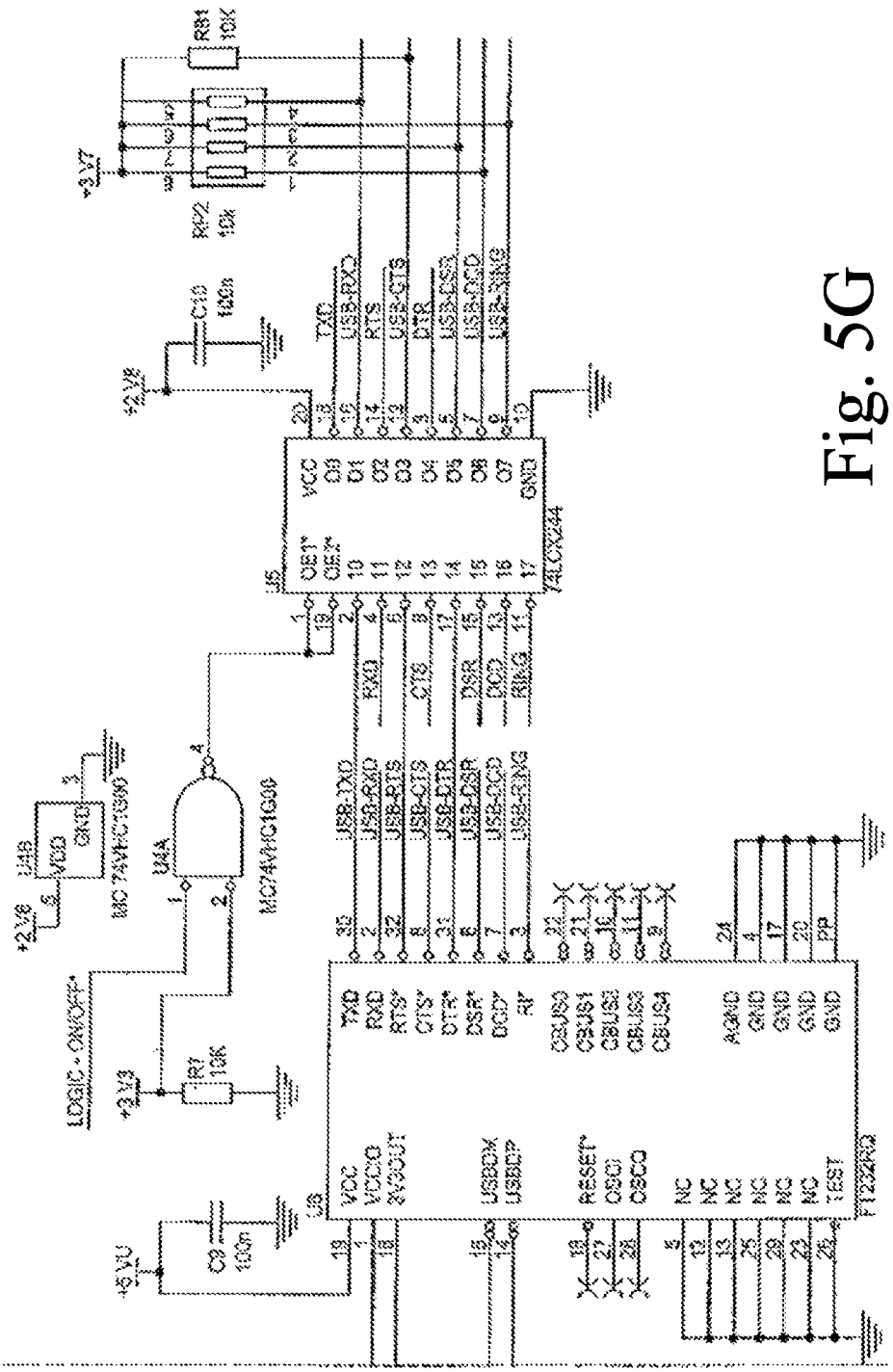
Figure 5H:
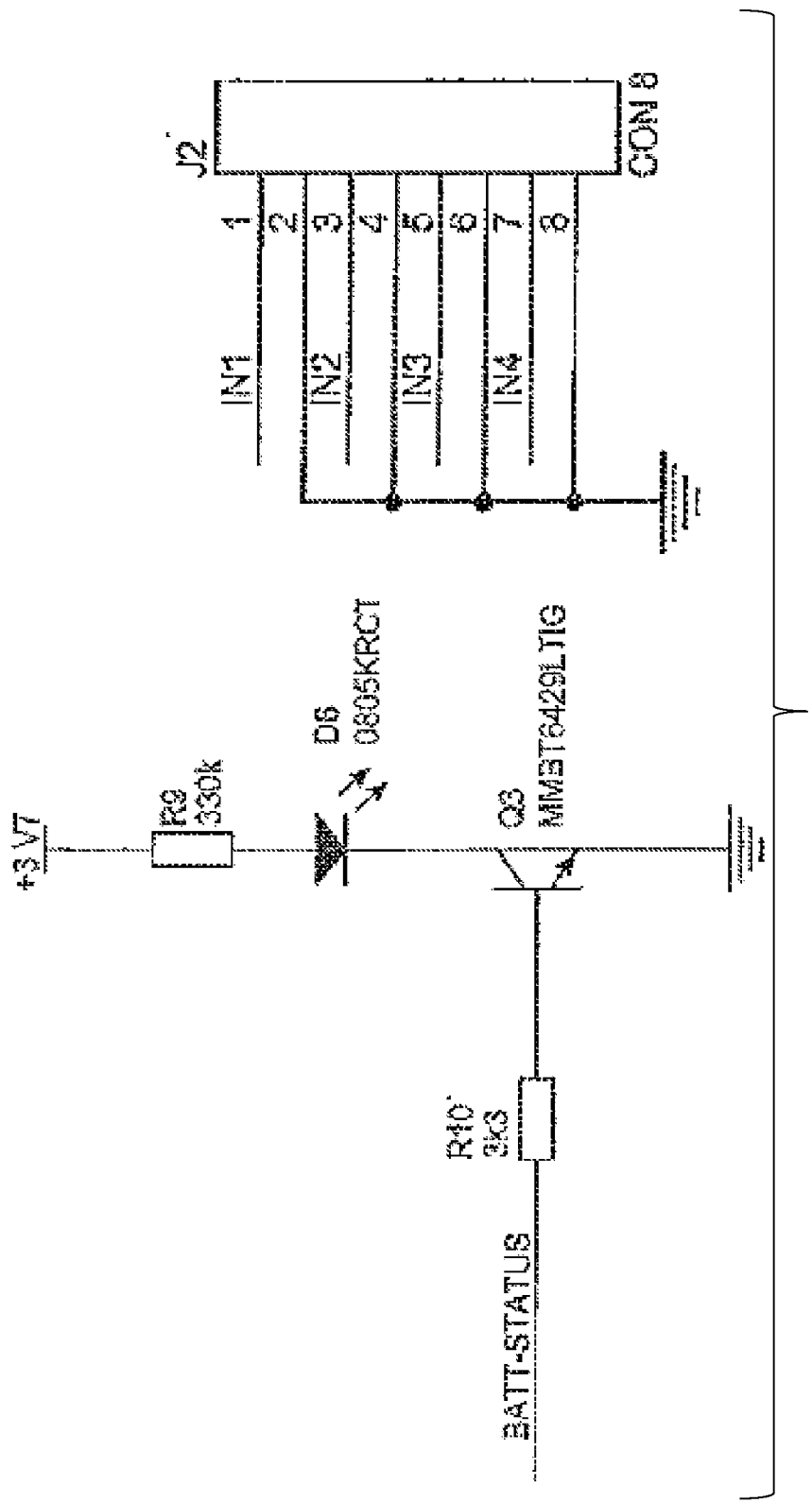

Battery Status Indicator (D6 on Circuit Diagram of FIG. 5H)

A visible indication of the charge status of the battery is provided using an LED (light emitting diode).

USB Connection (J3 on the Circuit Diagram of FIG. 5F)

The ISU device has a USB connection to allow the module to be connected to a Personal Computer. This connection allows the application scripts (software) to be updated in the GSM Engine. Power is also drawn from the Personal Computer to recharge the Li-ion battery. The power for the USB interface device (U6 on the circuit diagram of FIG. 5G) is taken from the USB connector. This reduces, for example minimizes, the current drawn from the Li-ion battery to extend the operational time between charges. Interface components (U4 and U5 on the circuit diagram) isolate the connections between the USB device and the GSM engine when either the USB port is disconnected (USB device powered down) or the GSM engine has been turned off.

A protection device (U7 on the circuit diagram of FIG. 5F) has been included on the USB port to protect the USB device from electrostatic discharge onto the pins of the USB connector.

External Sensor Inputs (IN1-4 signals on the circuit diagram of FIG. 5A).

The prototype ISU device implements four (4) external sensor inputs. These connections are available on a dedicated input connector (J2 on the circuit diagram) and on the special attachment connector (J4 on the circuit diagram of FIG. 5A). These inputs have been configured to allow (enable) external sensors to simply connect these input signals to a 0 Volt return signal (available on both connectors) using a relay contact closure. This is the typical output from a wide range of sensors.

An interface component (U3 on the circuit diagram of FIG. 5E) is provided to isolate the input signals from the GSM engine when the GSM engine has been turned off. There are also some protection devices (D2-5 on the circuit diagram) to protect the inputs of the interface component from electrostatic discharge onto the pins of the connectors.

Controlled Outputs (OUT1 and OUT2 Signals on the Circuit Diagram)

The prototype ISU device implements two (2) controlled outputs. These outputs allow external devices to be switched by the ISU device. These outputs are implemented using transistors Q1 and Q2. The connections to external devices can be made either by the dedicated output connector (J1 on the circuit diagram) or the special attachment connector (J4 on the circuit diagram).

Special Attachment Connector (J4 on the Circuit Diagram)

A special attachment connector has been provided on the ISU device to allow it to be plugged into purpose-built sensors. These sensors will be engineered to accommodate the ISU device and all of the required connections between the two devices are made through the single attachment connector. This connector supports attachments that are self-powered and are capable of providing current to recharge the battery in the ISU, as well as attachments that do not have their own power supply and require current from the ISU device's battery to operate.

The apparatus of a monitoring system may include a number of standard sensor devices (namely, one or more, optionally a plurality of) available for purchase along with, or in addition to the individual signal unit 22. Each sensor device is adapted to respond to a predefined stimulus, and may include sensors for power status, smoke detection, motion detection, door or window opening, button press, fluid level, tampering, location via the GPS system and video camera, for example. These standard sensor devices are provided as a simple plug-in to the individual signal unit 22, via one of the input connections 64 or USB port shown in FIG. 4, or other standard interface ports provided on the device.

An individual signal unit 22 may further be provided with internal error monitoring facilities, such as a power supply failure. Preferably also, individual signal units 22 are equipped with interference sensors to alert the central control facility 12 of tampering by unauthorised persons, or disturbance by animals for example. Individual signal units 22 in at least one preferred embodiment, are provided with output relays to activate one or more external devices according to pre-programmed responses to sensor monitored events. Examples may include the activation of audio and/or visual alarms, the switching on of security lighting, closure of fire doors and so forth.

The power supply and control module 42 is adapted to maintain individual signal unit 22 in a passive, standby state until receiving a signal from an external event sensor. Such a signal initiates a powering up of the device, enabling it to transmit its unique encrypted identifying code to the central control facility. After transmission of this signal the individual signal unit powers down and returns to its passive standby state.

An individual signal unit 22 may also be brought into a powered-up state on command from the central control facility 12. This powering up may be for the purpose of re-programming the individual signal unit 22 to install a new response procedure, for example after the installation of a new, or an additional external event sensor, relocation of the unit, or to modify an existing procedure.

Where an individual signal unit 22 is provided with data entry and display facilities, such programming or re-programming of the unit may be performed at the device itself. At the conclusion of such local data input, the new or modified data is transmitted to the central control facility to update its responses to any signals received from the individual signal unit as required.

Referring again to FIG. 1, during a powered-up state, as well as following any pre-programmed procedure for the activation of any local connected devices, the individual signal unit 22 will transmit a signal via the network 21 and a satellite 20, reporting the event to the central control facility 12.

In a first simplest preferred form of the invention, a signal sent by an individual signal unit 22 consists solely of its unique encrypted identifying code. No data is sent with this code. The information as to what a receipt of this code by the central control facility means, is stored in the central processing computers of the facility. This information, which is supplied by and under the control of the registered owner of the individual signal unit, may include instructions as to what actions are to be taken in response to the signal.

Although in this preferred form of the invention, the individual signal unit 22 is only enabled to transmit a single encrypted identifying code, it may do so in various ways to indicate various events. Each external event sensor is associated with a unique sequence of repeat transmissions of said unique identification code. For example, if an external sensor device is activated, the code may be transmitted a predetermined number of times for that particular sensor at short intervals. However, should an error condition develop in the device itself, such as for example a low battery situation, the code may be transmitted singly. The manner of transmission of this single encrypted code is then the determinant of the status of the device and of what action should be taken by the central control facility.

According to its pre-programmed instructions, an individual signal unit 22 may continue to transmit its signal at intervals for a pre-defined period as an aid in location of the device by service personnel alerted by the central control facility 12 as described below.

Again, with reference to FIG. 1, a received signal is acted upon by the central control facility 12, notifying any of a number of nominated recipients 30 (namely one or more of, for example a plurality of) according to a pre-established protocol negotiated between the registered user of the individual signal unit 22 and the control facility. Notification of details of a monitored event could be made in the form of an email via the Internet 29 as shown in FIG. 1, by facsimile transmission or over the distributed network 21 to any personal communication device.

Typically, one nominated recipient 30 will be the registered user or owner of the individual signal unit from which the alerting signal was received. However, nominated recipients may also include service providers, who are automatically notified of the occurrence and the nature of the event, the location of the individual signal unit and any other pre-defined details. Service providers may include police, fire and ambulance services, or equipment servicing personnel for example. At registration of an individual signal unit, the owner of the unit may elect that third parties be contacted only on receipt by the central control facility of authorisation from the owner.

An applicant user or owner will be required to supply all relevant details of the individual signal unit, its external event sensing faculties, intended location and the procedures to be implemented on receipt of a signal from the device. The central control facility then issues the unique identification code for the individual signal unit. Alternatively, an individual signal unit may be pre-programmed at manufacture with its unique identifying code. As well, the applicant user or owner nominates a service provider of the GSM, GPRS or other communication system, for billing purposes, or alternatively, the central control facility makes this arrangement, with billing for such service included in the overall charge for use of the system.

The information thus received is used by the central control facility to program the procedure to be followed by the facility in response to signals received from the individual signal unit. The facility may also transmit data to the individual signal unit prior to its commissioning but subsequent to its installation at the infrastructure item, to set the parameters of signal transmission, such as frequency and interval of repeat transmissions for example.

Second Preferred Embodiment

In a second preferred embodiment, the individual signal unit of the present invention again includes at least a transceiver module 40, a rechargeable power supply and power control module 42, and at least one external event sensor 44 and a logic circuit 46 as shown in FIG. 1. In this embodiment however, the unit may further be provided with a data storage device able to record analogue or digital input from a device connected to the individual signal unit.

In this embodiment also, the unit is not restricted in its transmission to the central control facility of its unique identifying code but is enabled to transmit the input analogue or digital data, either in real time, or retrieved from its data storage device at predetermined times or on command form the central control facility.

Thus, in this form, the individual signaling unit may have attached as an input device such equipment as a video camera, sound recording equipment or a Global Positioning System (GPS) module for example. The connection of a GPS module allows the individual signal unit to report its location, either continuously, at predetermined intervals or on command from the central control facility. Similarly, a video camera may send images on a continuous basis, at predetermined intervals or as commanded. Alternatively, data from a camera, GPS module etc. may be data storage device (if so provided) of stored in the individual signal unit for later interrogation and central control facility.

In either of the above-described preferred embodiments, an individual signal unit may be provided with an on/off facility adapted for local activation. That is a facility whereby a registered user or other authorized person can switch the unit between power off and standby for monitoring. This facility may be a Radio Frequency (RF) responder unit, either incorporated in the individual signal unit itself, or as a connected input device.

Connectivity

Figure 20A:
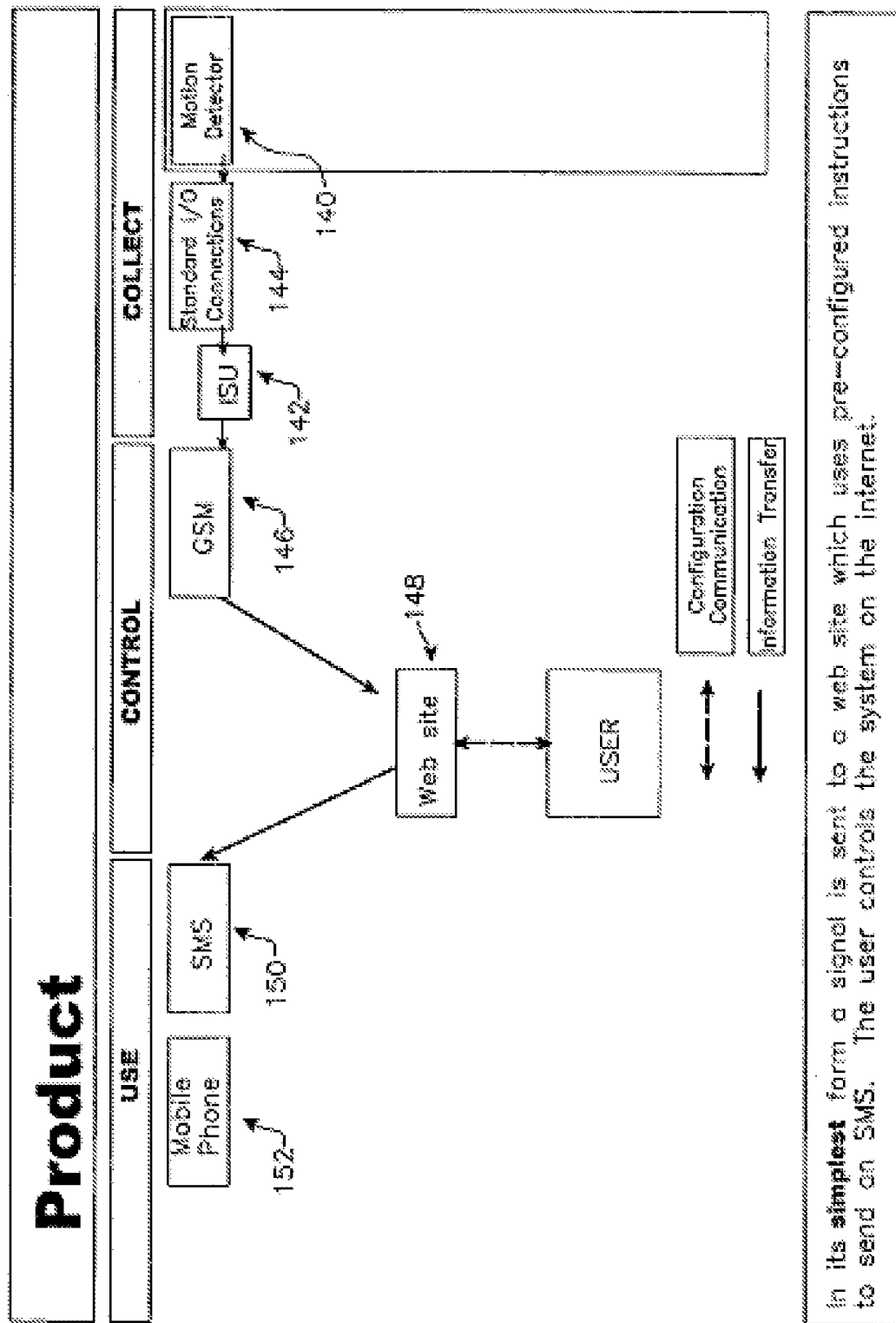
FIGS. 20A to 20H represent a diagram indicating examples of the interconnectivity of an individual signal unit (ISU) with a variety of communication systems, input devices, the web site of a central control facility and of that facility's outputs.

The flexibility of the individual signal unit (ISU) in the many ways it can be interfaced with other devices is illustrated in FIGS. 20A to 20D. In its simplest form as illustrated in FIG. 20A, some sensing device, for example a motion detector 140 is connected to an ISU 142 via a standard input/output (I/O) connector 144 provided on the ISU. In this instance the ISU 142 has been configured to send a signal, when activated by input from the motion sensor, via a GSM network 146 to the central control facility (represented in these figures by its web site 148). The web site 148 of the central control facility acts on the received signal according to pre-configured instructions received from the user of the ISU 142. In this example, an SMS message 150 is sent to the user's mobile phone 152.

Figure 20B:
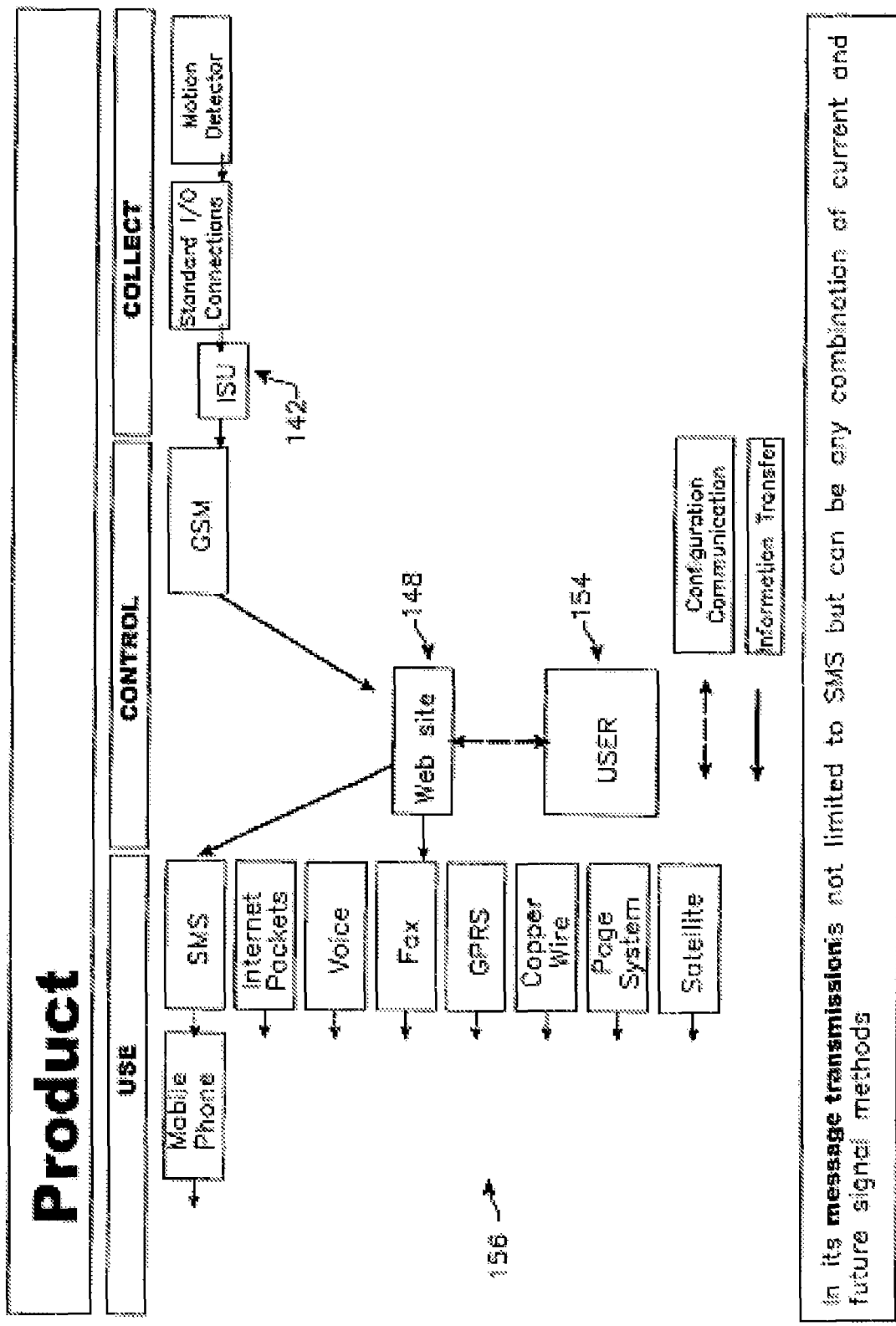

As shown in the sequence illustrated by FIGS. 20B, the web site 148 of the central control facility may communicate with the user 154 of the ISU 142 over any one or combination of current or future communication systems 156.

Figure 20C:
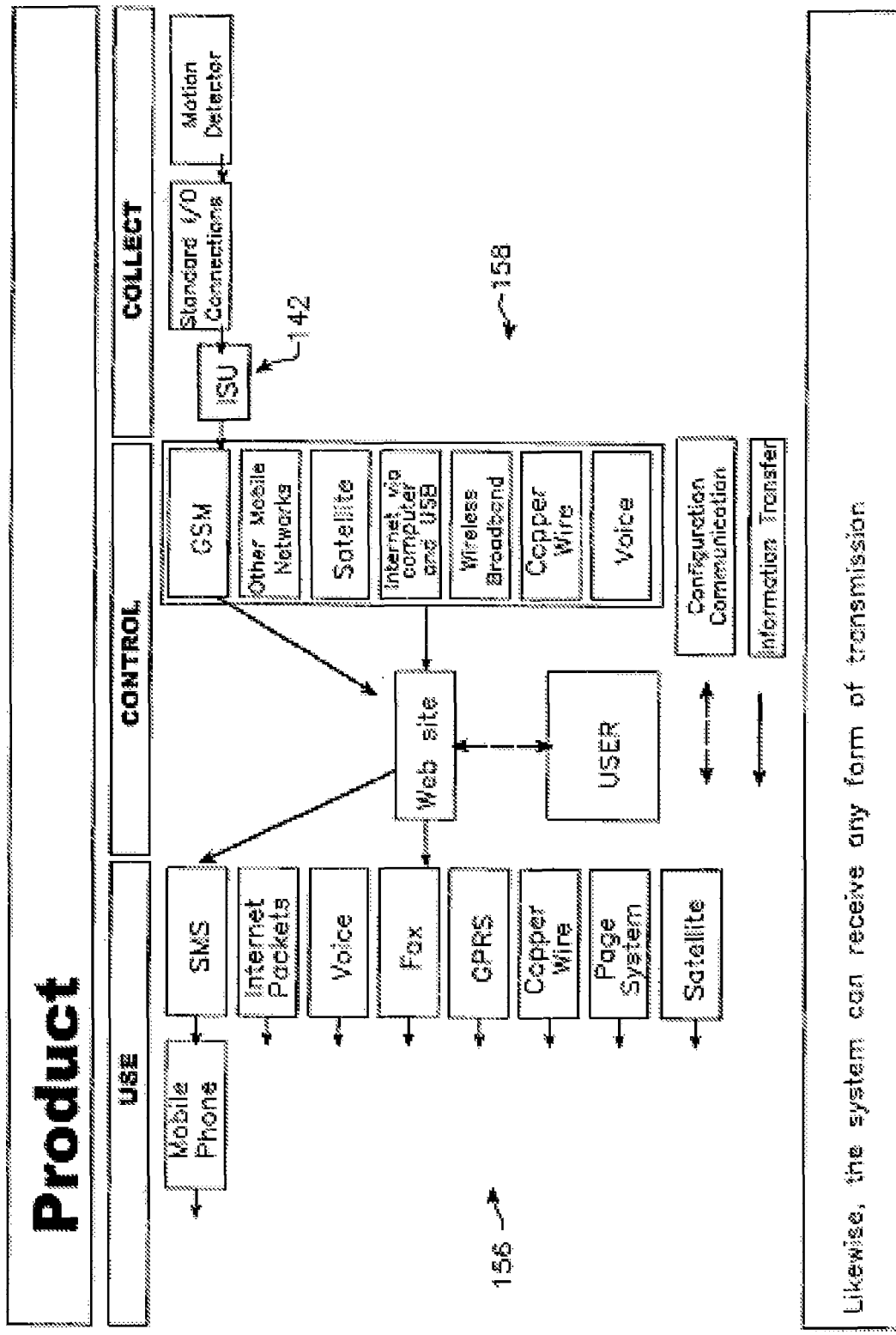
Figure 20D:
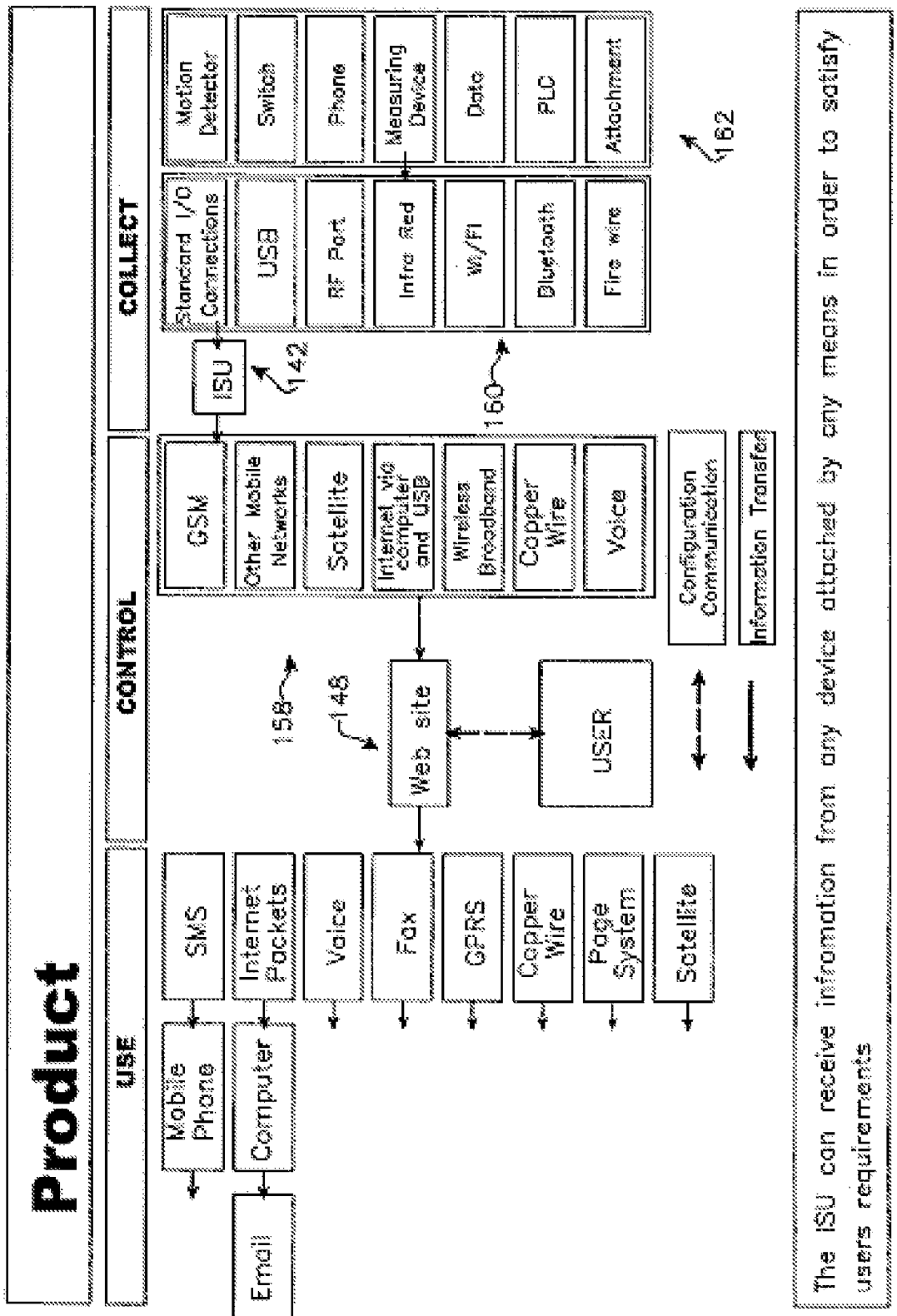
Figure 20E:
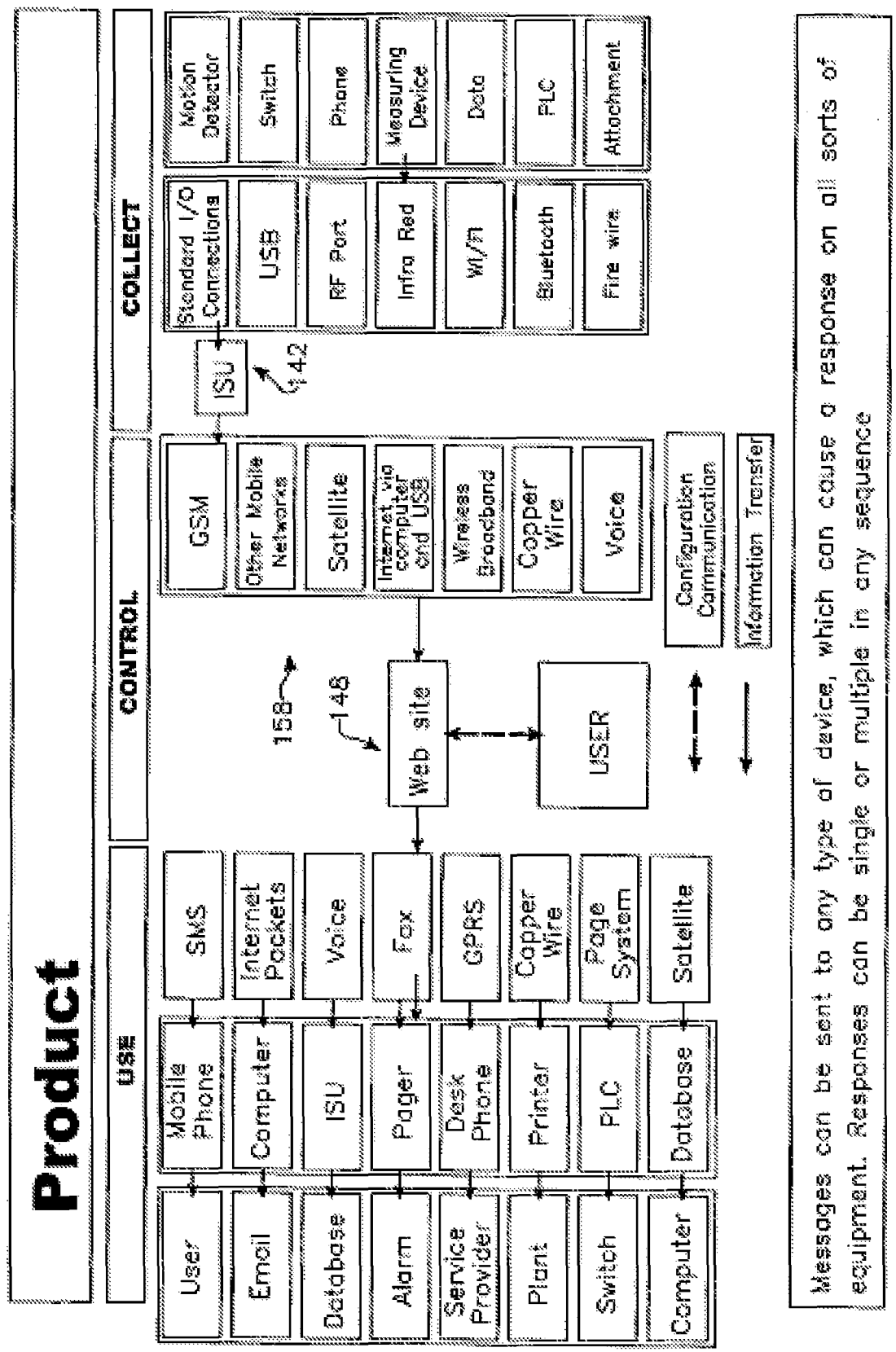

Likewise, as shown in FIG. 20C, the ISU 142 and central control facility may be configured to send and receive a signal from a sensed event via any form of signal transmission, and as further illustrated in FIG. 20E, messages to a user or registered owner of an ISU 142 may be transmitted to any type of communication device.

These may include SMS messaging, Internet, voice, facsimile transmissions, use of the GPRS system, telephone, pagers and satellite. Thus, the central control facility may communicate the occurrence of an incident to the user's mobile phone, computer, land-line telephone, and facsimile machine. As well, the control facility may, where appropriate, communicate with another ISU, programmable logic controller (PLC) or transfer data to a designated database. Thus, by connecting an output device, for example a PLC, actuator, or motor and the like, to an ISU, the predefined steps or actions to be executed could include the initiation of processes at the remote location at which the ISU is situated.

Also as shown in FIGS. 20D and 20E, the ISU may be configured with a number of standard input/output connectors 160, including but not limited to, USB and RF ports, Infra-Red, Wi/Fi, Bluetooth and Fire Wire receivers for example. Sensors 162 communicating with any one or more of these connectors may include, motion detectors, switches, telephone, measuring devices, data sources, programmable logic controllers and other attachments. Depending on its configurations, the ISU 142 may communicate with the web site 148 of the central control facility by any of a number of distributed communication systems 158. These may include, as shown on FIG. 20E, the GSM or other mobile phone networks, satellite-based systems, the Internet, wireless broadband, the copper telephone network and voice.

Figure 20F:
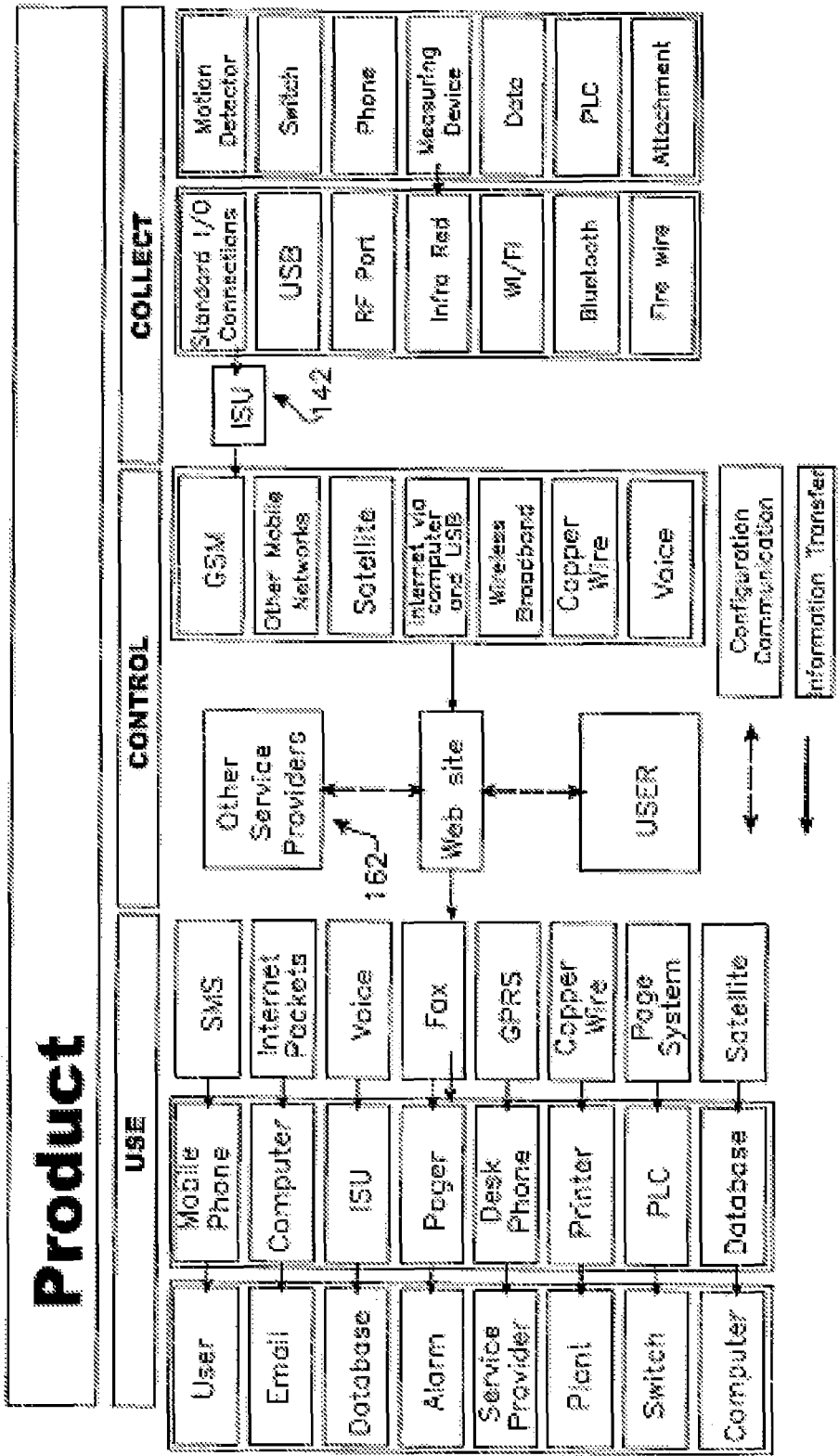
Figure 20C:
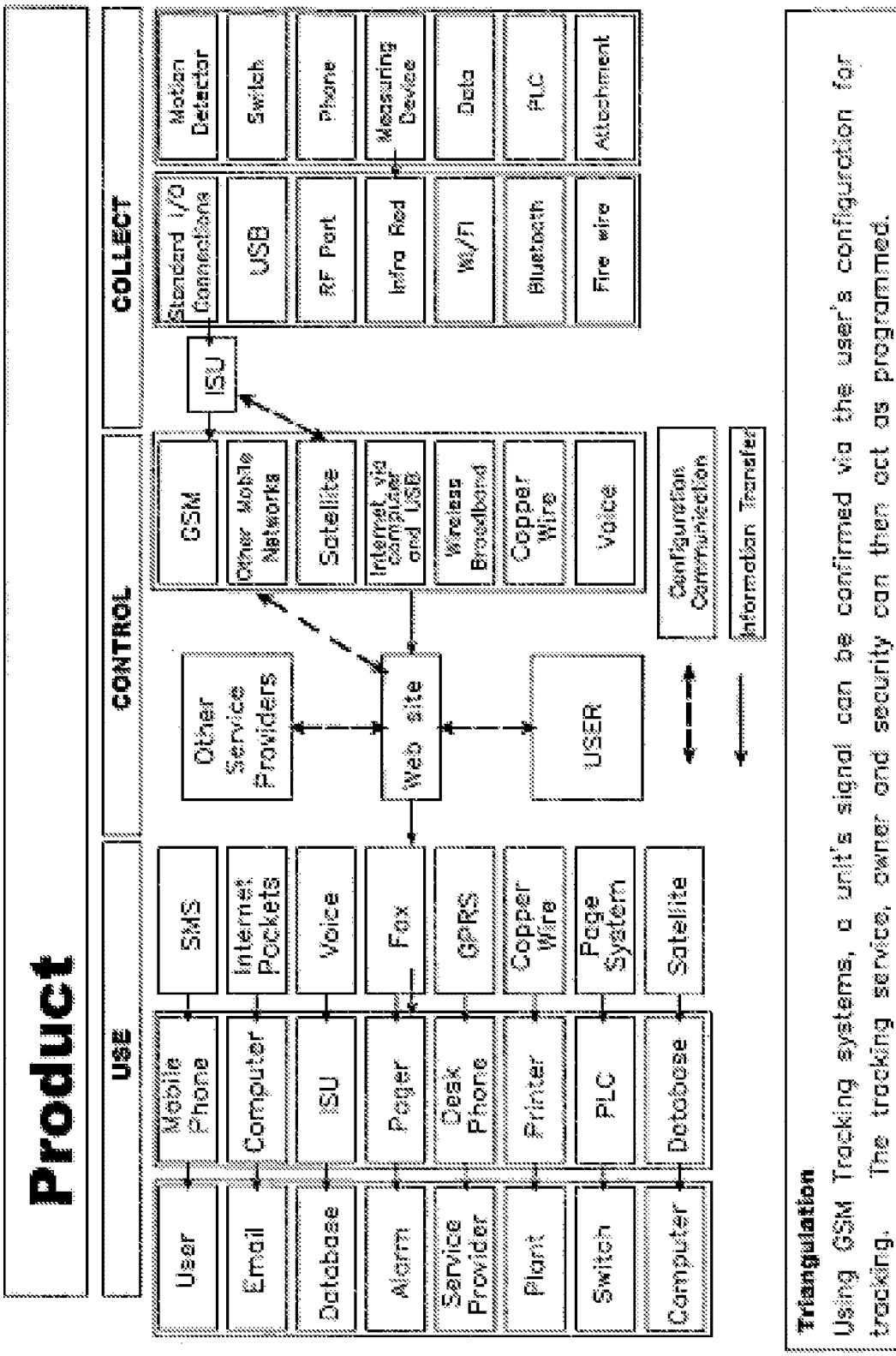
Figure 20I:
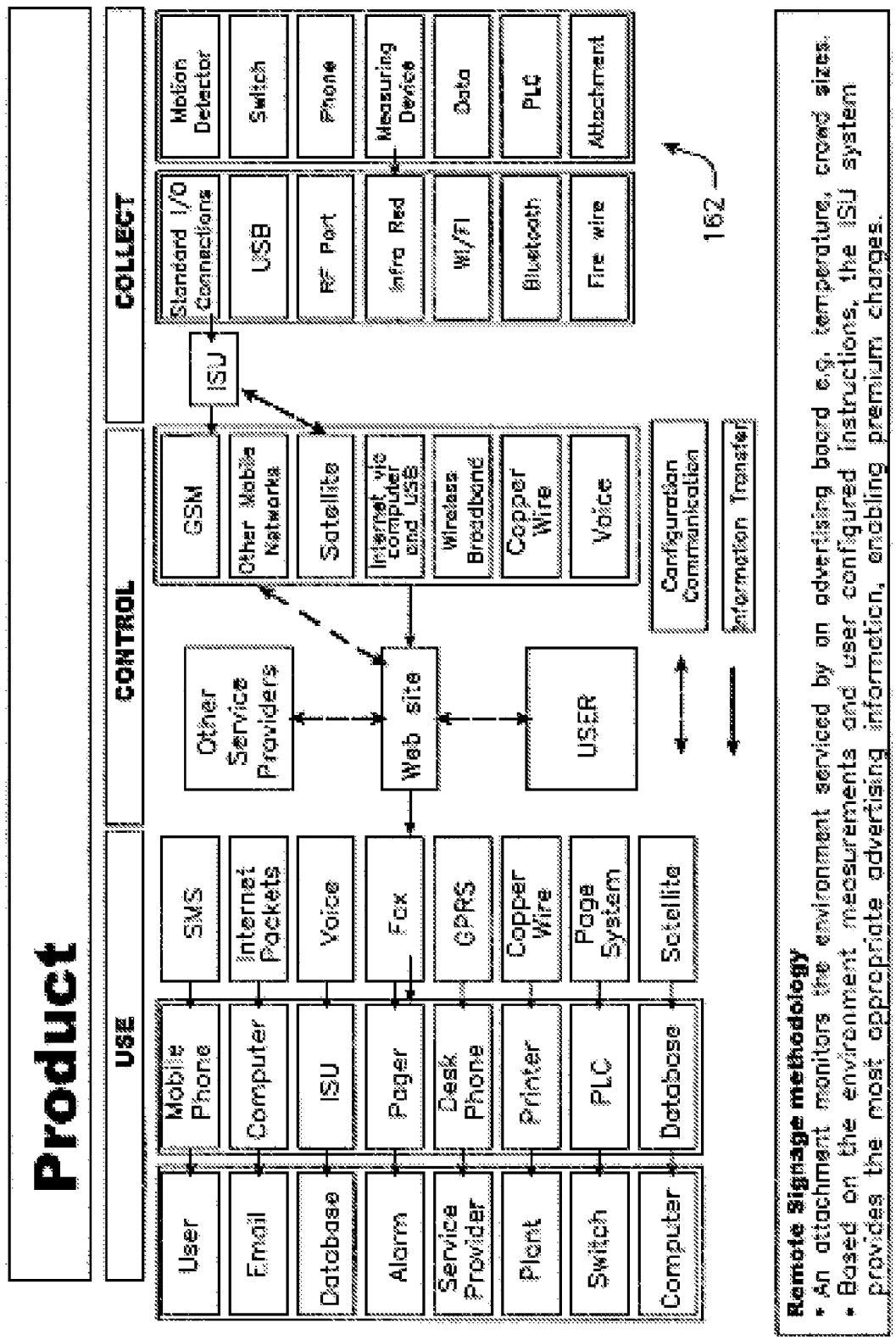

In addition to these communication systems being used to send messages or other forms of communication to the user or registered owner of the ISU, the central control facility may use the same systems for communication with other service providers as shown in FIG. 20F. Using tracking systems available via the GSM network, an ISU's signal can be used to determine its location as indicated schematically in FIG. 20G.

FIG. 20H shows still a further example of how the connectivity of the ISU with sensing equipment may be utilized. Sensors 162 associated with an advertising board may monitor for temperature, crowd sizes or other parameters associated with advertising effectiveness. Based on these measurements and in accordance with the ISU user's configured instructions, the ISU may provide the most appropriate advertising information, thereby enabling premium charges.

Some further features of the monitoring system according to the invention include:
- the ISU and server are programmable and can support a wide range of inputs.
- The ISU is not restricted to the above-described inputs and outputs. Additional or alternative inputs and outputs can be readily added to the design.
- The ISU can support a variety of transport mechanisms including CDMA, 3G and satellite depending on what distributed communication system is available.
- The message server of the central control facility is based on scalable architecture allowing it to be duplicated or upgraded to support increased traffic in the future.
- The ISU can support a simple LCD or other graphic display unit, to provide a user with status information.
- The ISU can be integrated into products as an OEM (Original Equipment Manufacturer) module. This may be a user upgradeable or factory fitted option.

The monitoring system of the present invention lends itself to commercial exploitation in a number of ways. Some of these may be summarized as:
- Licensing of complete systems developed by others as ISU certified
- Retail of ISUs for ad hoc users
- Inviting existing products and services to join user configurable web-based systems
- Additional programming and systems service charges
- Building custom-designed measurement and control applications
- Asset monitoring, for example
- Vehicle care
- Security
- Innovative equipment hire options
- Triangulation
- Wildlife and stock tracking
- Scheduling
- Environmental monitoring
- Asset control, for example
- Environmental control—local government, national parks, defense
- Plant control—factories, farms, local government
- Access control—remote door opening Revenue may be derived from a number of activities associated with the ISU based monitoring system, for example:
- Unit sales—ISUs and attachments
- Unit rentals
- Monthly registration fees—ISU network, optional services
- Network services charges (e.g. SMS, GPRS etc.)
- Development—programming, design
- Annul license fees for custom or retrofitted applications
- Access to ISU network fees for other service providers
- Industry co-operation commissions (e.g. Insurance rebates
- License fees from monitoring agents (e.g. Callout providers)

With reference now to FIG. 24, with an ISU fitted to a vehicle and interfaced with the vehicle's onboard computer, the vehicle becomes another device for which the registered owner of the ISU can configure various actions associated with aspects of the vehicle. One category of configuration as shown in FIG. 24 is a listing of preferred or potential servicing facilities for the vehicle from which quotation may be solicited for servicing or repair. Performance and satisfaction ratings may be assigned to these facilities garnered from data collected by third party assessors and supplied to the central control facility.

A further configurable option shown in FIG. 25, is for the owner or manager of the vehicle to receive data of performance parameters of the vehicle.

FIG. 26 shows a possible result of a vehicle management configuration using the ISU in a vehicle to arrange for servicing of the vehicle at a predefined service interval. The ISU, monitoring the vehicle's onboard computer, signals the central control facility that the vehicle has reached the given odometer reading. This activates the central control facility to obtain quotations for service and possible dates at which the service may be accommodated from the three-service nominated by the vehicle's owner at registration.

To provide the above service to purchasers of an ISU for an in-vehicle application, the central control facility may establish a database of service providers willing to offer services and provide quotations to registered users of the ISU monitoring system. FIG. 27 shows a web-based page service providers may use to register, including the provision of details of any specialised services they may wish to nominate.

This aspect of the application of the monitoring system of the invention provides for a further revenue stream for the central control facility. An example of a pricing structure for vehicle service providers who wish to promote their services to owners of vehicle based ISUs is shown in FIG. 28.

Componentry

As set out in more detail above, the principle components of the ISU are:
- Network module
  - Processor
  - memory
  - Connectors
  - Power source Within these broad component modules, the ISU may be configured in various models with varying attributes:
- Network—interchangeable
- Connectors—versatility and adaptability focused
- Capacity—storage, transmission quantity of data
- Durability—weather proofing, water proofing, shock proofing
- Power—mains, battery, solar. Achieving long standby periods of 5 years
- Compact size As an example of one possible configuration, an ISU could comprise, a GPRS Module GM862; I/O Connector (J4) 2214R-16SG-85; Light Pipe C435815; LED (alarm and network) 0805KRCT; Switch (On/Off) ELTSA-63; USB Connector 5075BMR05SM; 4 Pin Edge Connectors S4B-

PH-K-S(output); 8 Pin Edge Connectors S8B-PH-K-S(input); Battery Sanyo UF55344F; Arial Coax 22-SMA-50-0-53.

Attachments

The ISU may be adapted to accept input from virtually any signal producing device. Some currently known examples include: motion detectors, Bluetooth accessories, alarms, detectors and responders.

Other attachable devices include programmable logic controllers, (which may for example be programmed to act on vending machines, dispensers and robots), message boards, remote monitoring devices, RF networks and remote-control units.

In Use

Individual signal units 22 are added to the monitoring system 10 by registration with the central control facility 12. Such registration may be accomplished by an applicant user or owner over an Internet web site maintained by the central control facility. Data monitored by an individual signal unit can only be accessed by the registered owner or by third parties authorised by the owner, through use of a user name and password established when a unit is first registered.

The Public User

A new private user of the system may purchase an individual signal unit 22 at any authorised outlet, such as for example a mobile phone retailer. As well he or she may select from a range of standard sensor units compatible with the individual signal unit also available at the authorised outlet or obtainable from an accredited supplier. Preferably, the individual signal unit is adapted to accept as input up to four individual sensor devices via input connector 64. Thus, for example, an individual signal unit may have connected a motion sensor, a video camera, a microphone as well as a smoke alarm (not shown).

Preferably also, the individual signal unit 22 is provided with at least two output relays via output connectors 66, to which may be connected external devices such as security lights or audio alarm for example.

Figure 6:
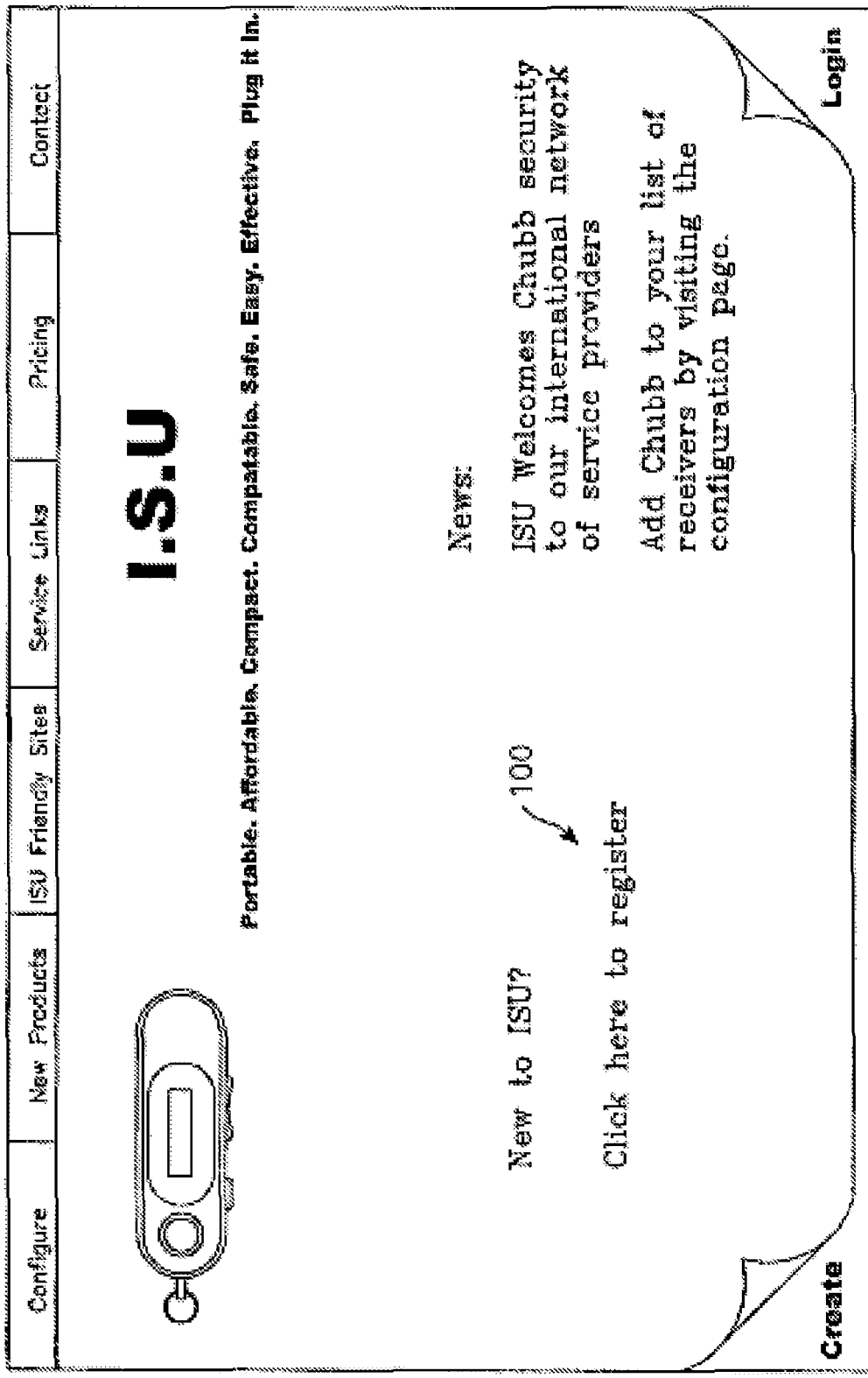
FIGS. 6 to 12 are pages of a possible web site for registering an individual signal unit with a central control facility.
Figure 7:
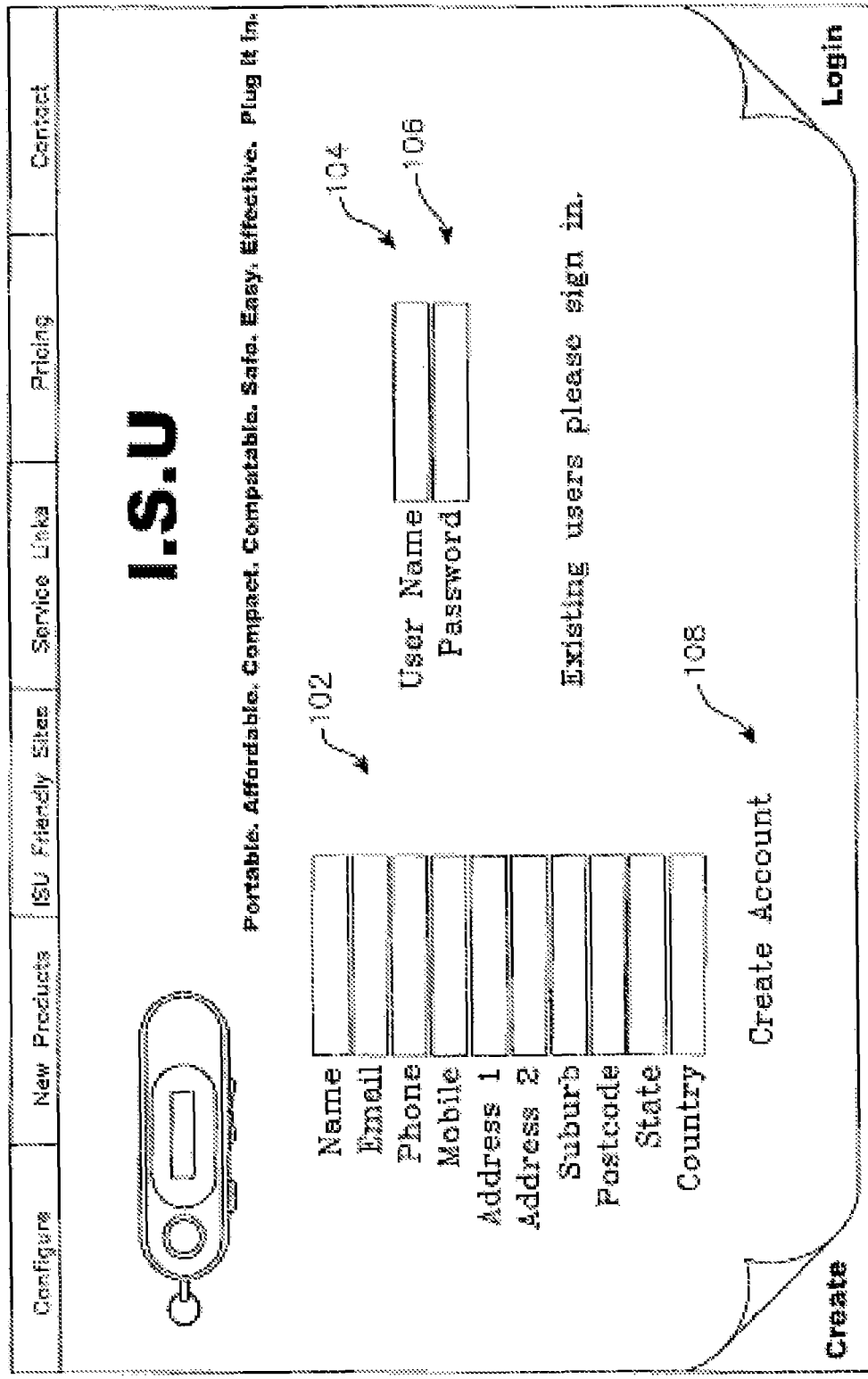
Figure 8:
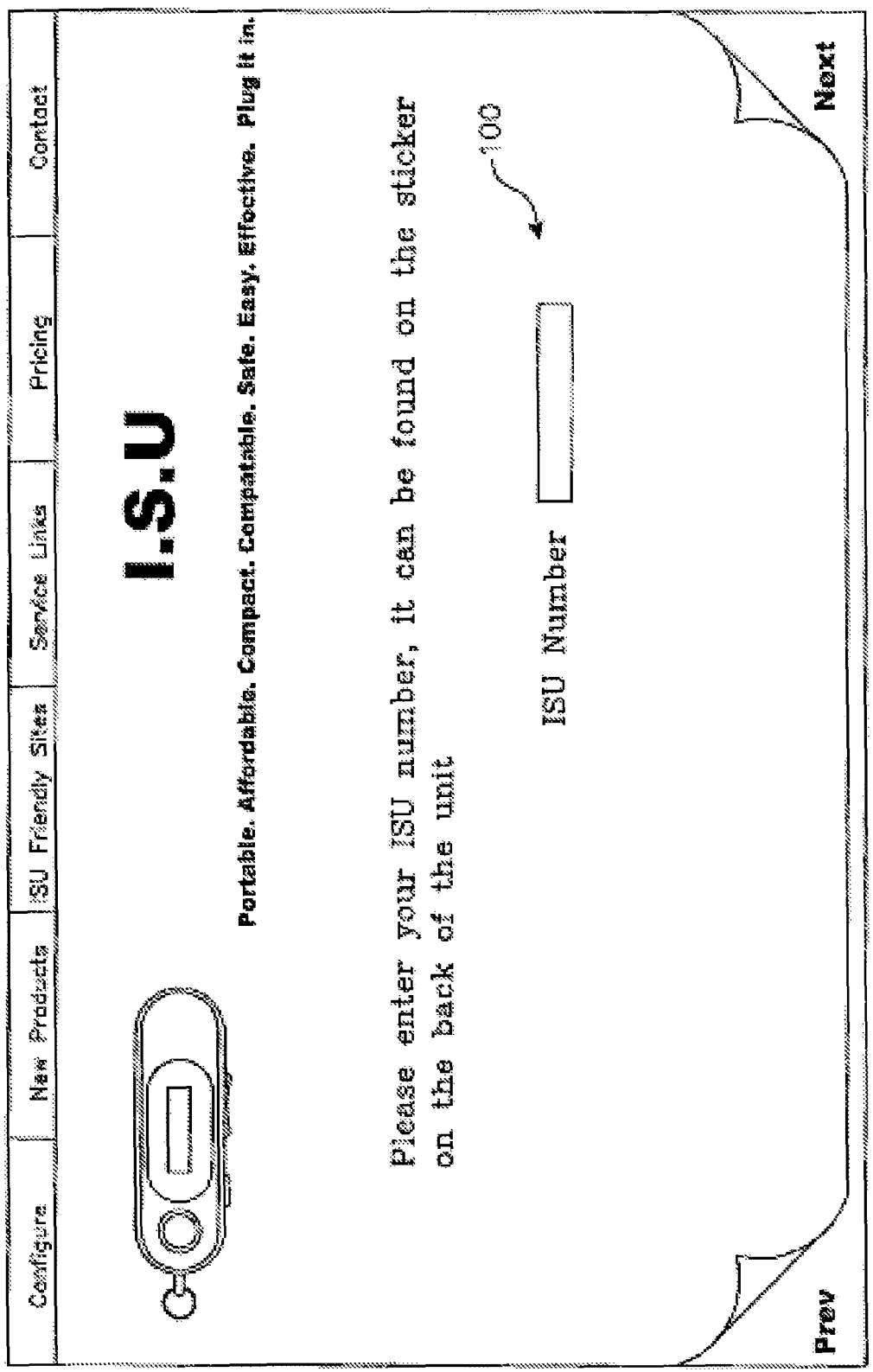
Figure 9:
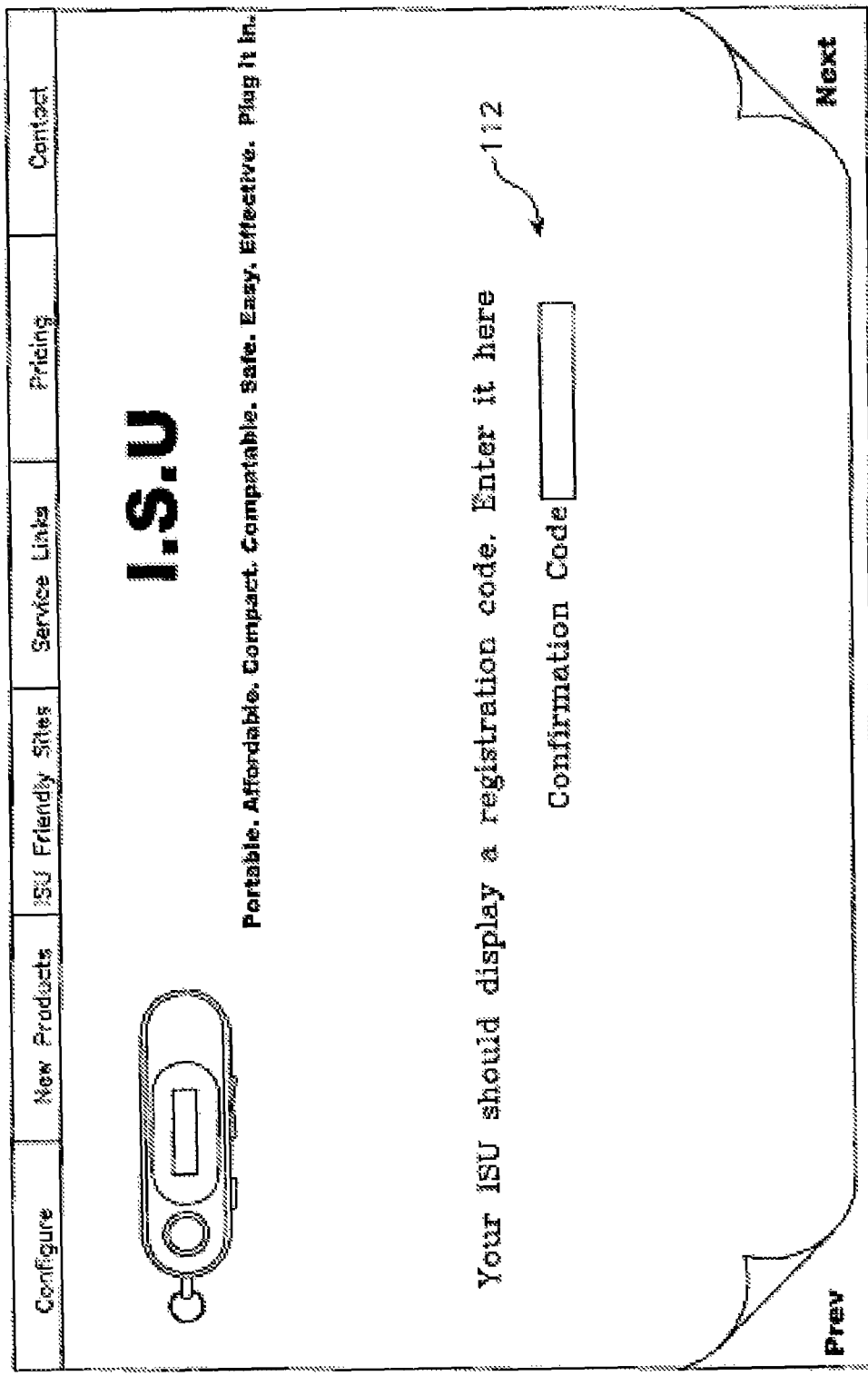
Figure 10:
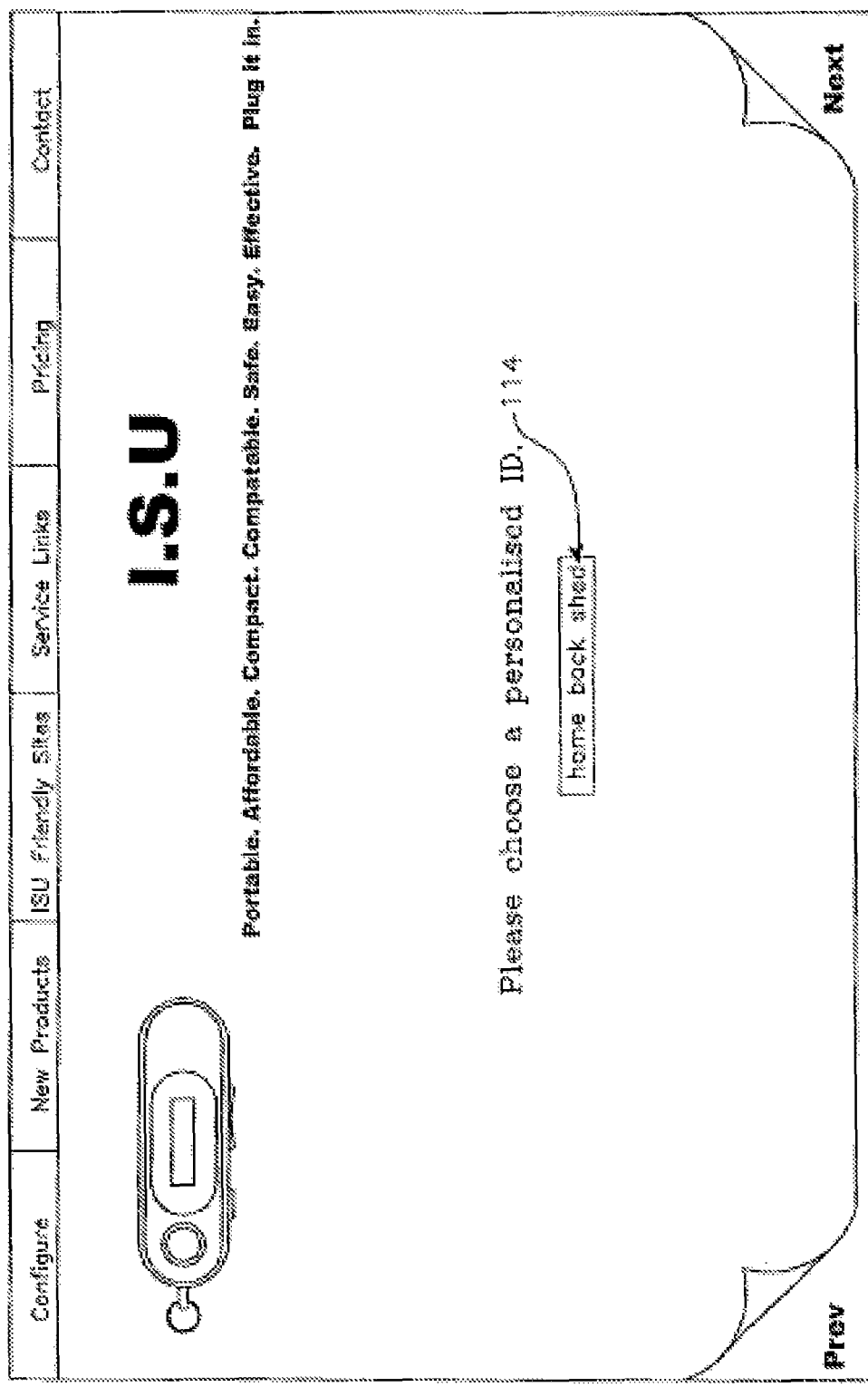
Figure 11:
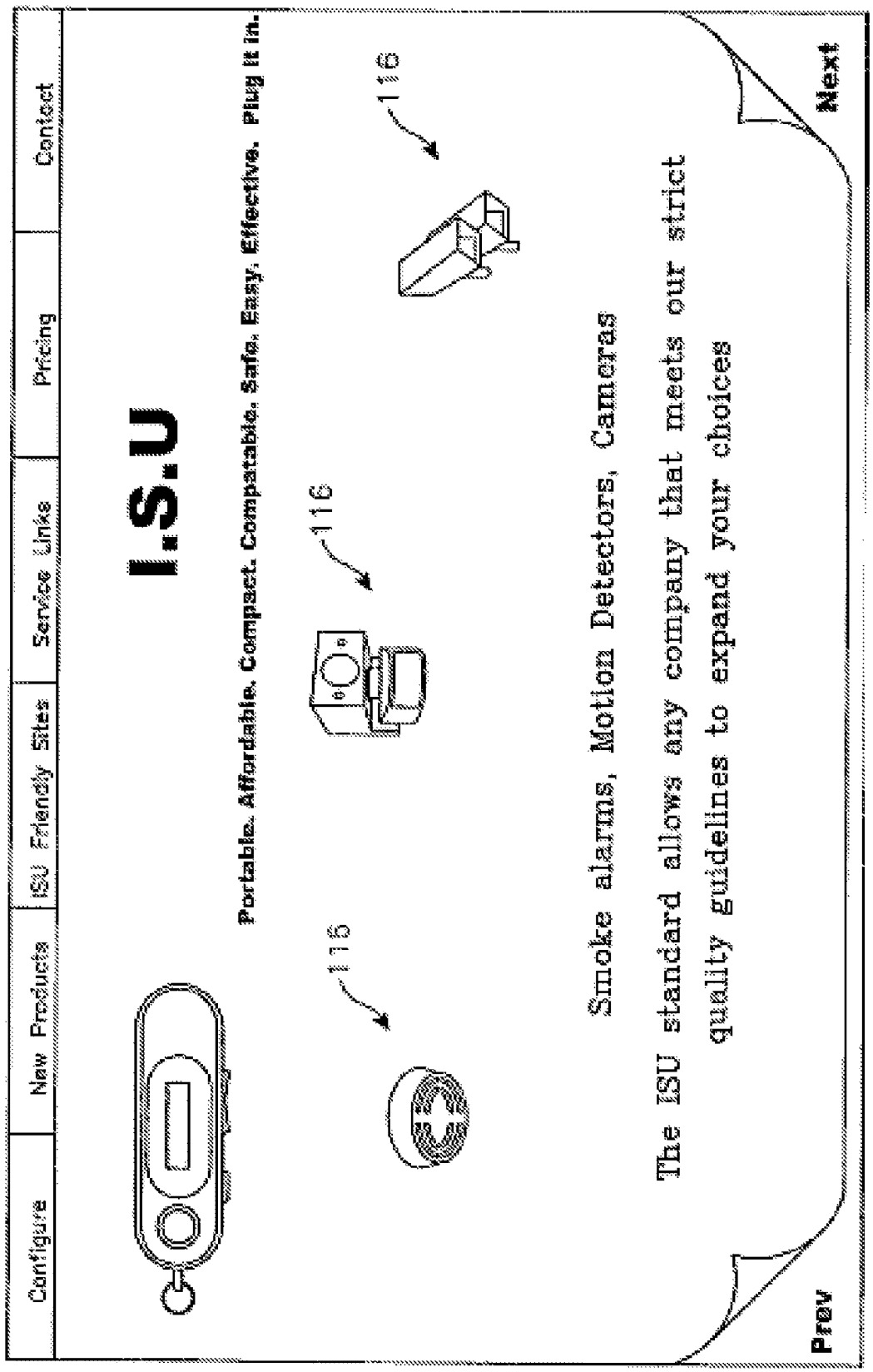
Figure 12:
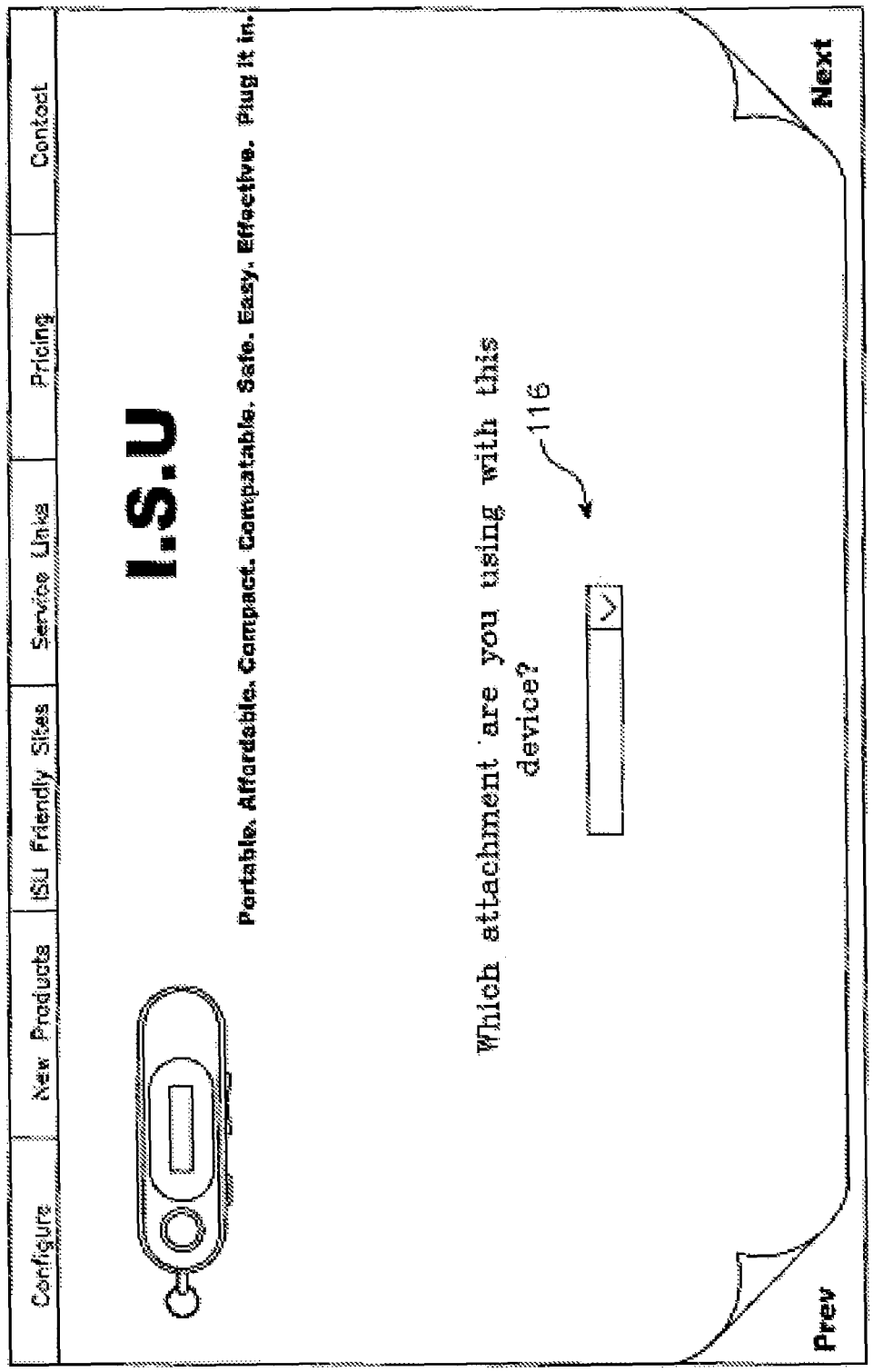
Figure 15:
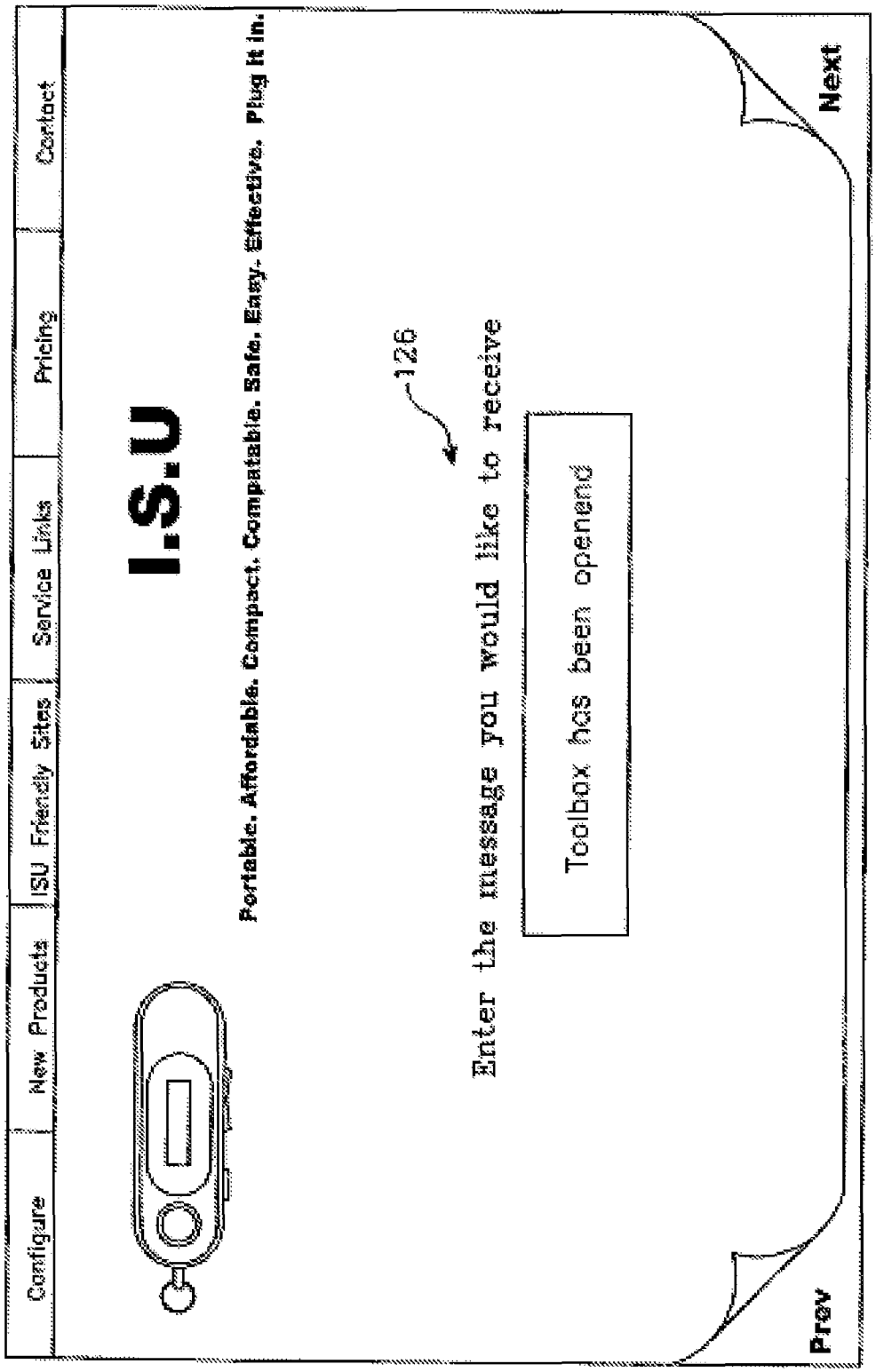

To make use of the equipment, a new owner must register with the central control facility, preferably over an internet web site maintained by the facility, or by telephone. With reference to FIGS. 6 to 12, the process of registration over the facility web site includes the following steps;

1. After logging onto the web site and selecting the option of registering 100 as shown in FIG. 6, the owner enters personal details 102 and selects a user name 104 and password 106 for future interaction with the facility, as shown in FIG. 7.
2. At this point also the owner is required to establish an account with the facility for billing purposes.
3. Next, as shown in FIG. 8, the owner is invited to enter the identification code number 110 of the purchased individual signal unit. This may be provided on the packaging in which the device was purchased or, preferably printed on a removable sticker attached to the device itself, (for example in the space 72 on cover portion 54 as shown in FIG. 4).
4. If the device is provided with a display module, a Confirmation Code is displayed when power is provided to the unit, that is when it is first switched on. This number 112 is then also entered as shown in FIG. 9.
5. For ease of identification, the owner may nominate a brief description 114, typically associated with the function or location of the signaling unit and its connected sensor/s, as shown in FIG. 10. For a fixed device, that is one that is not expected to, or which should not move from its installed location, the geographic location may be specified at registration, by means of recording the coordinates from a GPS unit.
6. The owner is then invited to nominate which sensor unit or units are to be connected to the individual signal unit, either by clicking on an icon 116 as shown in FIG. 11, or from a drop-down menu 120 as shown in FIG. 12.
7. When registration formalities have been completed, the owner is given the opportunity to configure the individual signal unit; that is to establish the protocols to be followed by the central control facility in response to a signal transmitted by the device.
8. As shown in FIG. 13, monitoring of the unit may be within specified times 122 or be continuous. Clearly, where for example a device is installed in commercial premises, monitoring for security purposes may only be desired outside working hours.
9. The inputs of the web site page shown in FIG. 14 allow the owner to specify some parameters as to the conditions 124 which must obtain for an alert situation to be reported.
10. As shown in FIG. 15, the owner may then nominate a message 126 which is to be sent to the owner in the case an alert situation arises.
11. The input web site page of FIG. 16 allows the owner to nominate one or more ways 128 in which an alert message is to be sent by the facility. It also allows the owner to nominate a service supplier, for example a security agency which may be instructed to inspect the site of installation of the individual signal unit. In addition, commands can be specified to activate any external device/s which may be connected to the individual signal unit outputs, such as the switching on of a security light.

This sequence of steps completes the registration and configuration of the individual signal unit, the attached sensor and any output device/s and the response steps to be taken by the central control facility if a signal from the registered individual signal unit is received.

Figure 17:
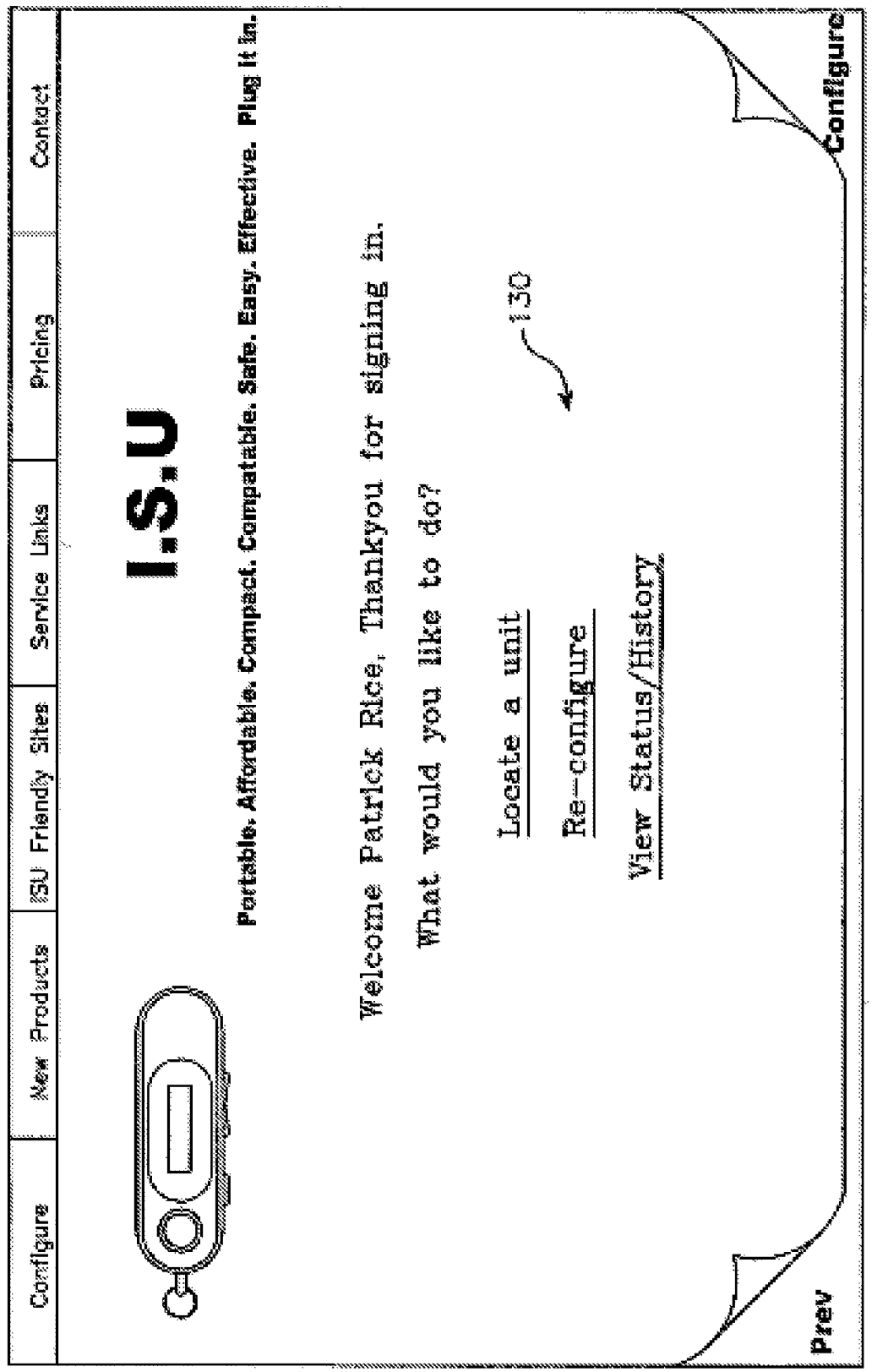

In addition to registration and configuration, the central control facility web site may be accessed at any time by the owner (or other authorised person) of a registered individual signal unit, by entering security user name and password, for example. Several options 130 are then presented to the owner of the individual signal unit as shown in FIG. 17.

Figure 18:
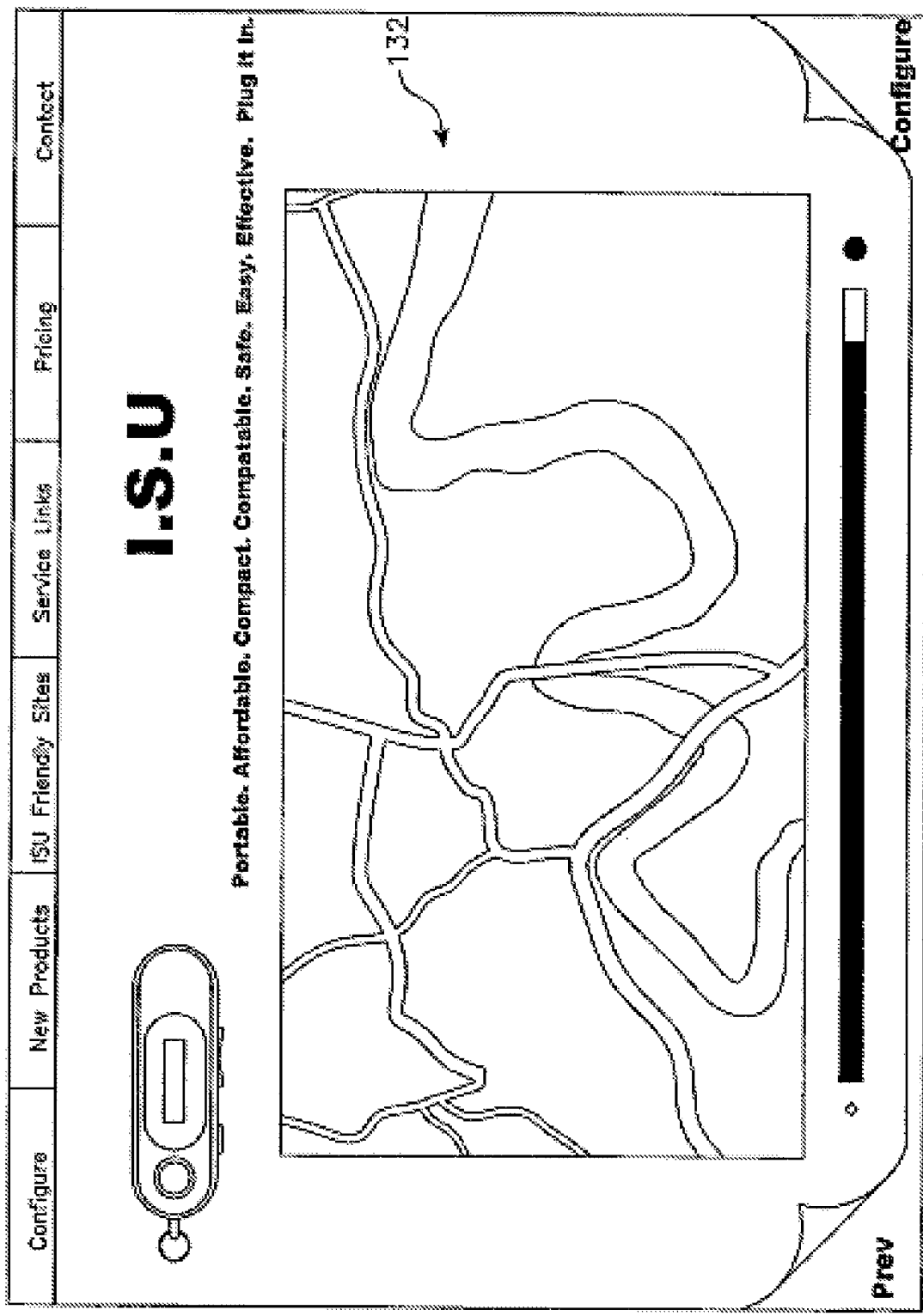

One of the available options is the facility of locating an individual signal unit. When this option is selected, but the individual signal unit is not fitted with a GPS module, the central control facility can command the individual signal unit to transmit its unique identifying code for a sufficient length of time to enable triangulation of its location from three or more stations of the distributed communication network. This location is then superposed on a map 132 and the map and marked detected location relayed to the owner of the individual signal unit as shown in FIG. 18.

Another option available to a registered owner is the ability to reconfigure the registered individual signal unit. This may be desirable if the device is to be moved to another location, used for a different application, or sensors added or removed from the device for example.

Figure 19:
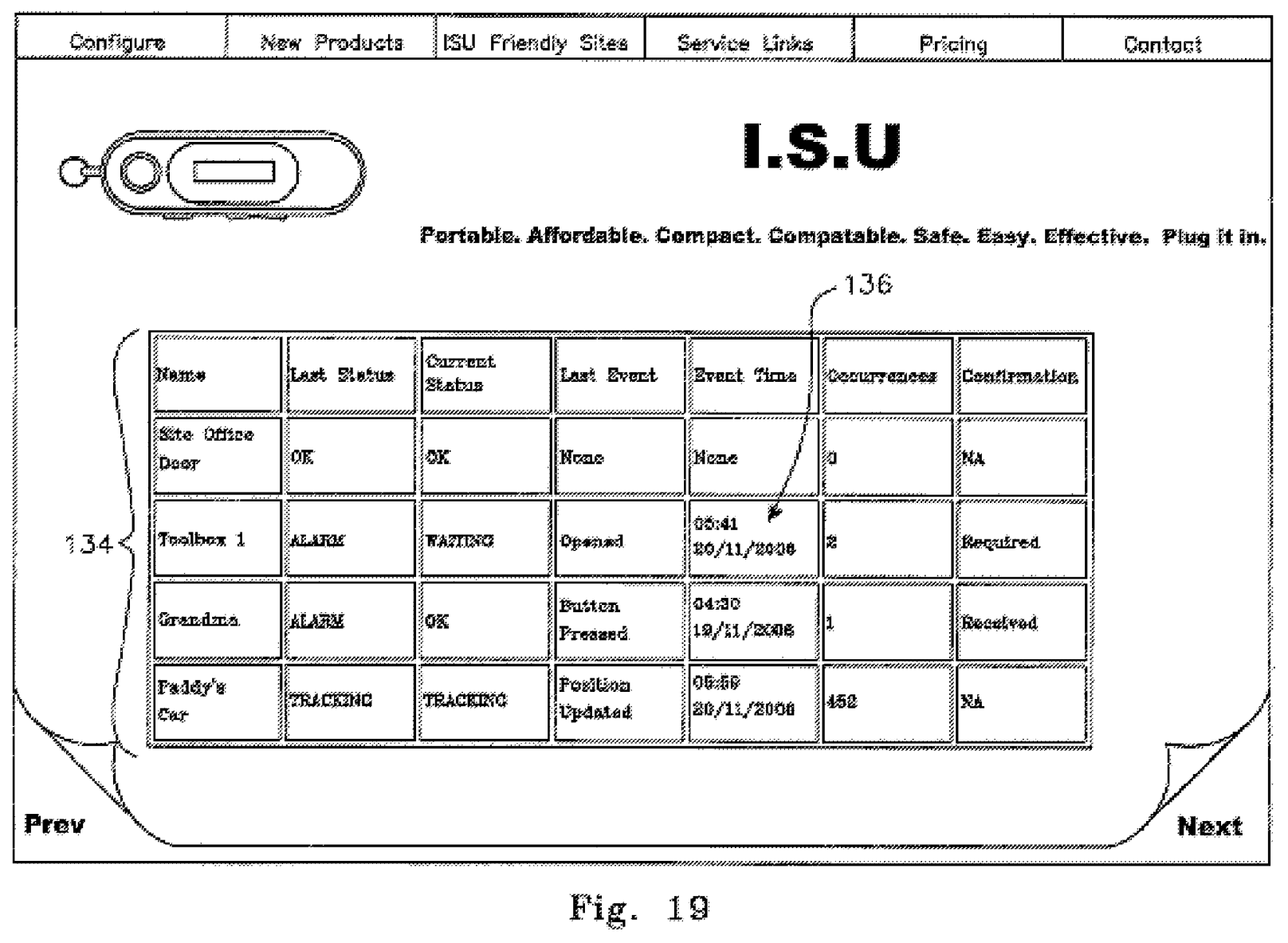

A third option available to the registered owner, is that of checking the current status of the device and its event history. As shown in FIG. 19, this information may be displayed to the owner in tabular form. In the example shown, this owner has four devices 134 registered with the central control facility, and can see at a glance the current status as well as a record of detected incidents reported by each sensing device.

For example, "Toolbox 1" may be a toolbox fitted with an individual signal unit, located on an item of earth moving plant left unattended at a work site. The tabulated history shows it has been interfered with at the time and on the date shown 136. Depending on the pre-programmed procedure associated with the individual signal unit, the owner or personnel responsible for the equipment may be alerted within minutes. Alerting messages may be transmitted via any preferred or multiple media, for example by telephone, mobile phone text messages, facsimile or by email.

"Grandma" may be an individual signal unit incorporated in a personal security module in which the sensor is a push button, providing an elderly (or incapacitated) person with a means of alerting someone to a distress situation.

The Commercial User

The individual signal unit of the present invention may be incorporated at manufacture (or be retro-fitted) to an item of infrastructure or instrumentation. Individual signal units so incorporated are registered with the central control facility in a similar way to that described for the public user above. In the example given earlier of streetlight fittings, streetlights under the control of a local authority are fitted, preferably at manufacture, with a sensor and individual signal unit. The individual signal unit for each streetlight is assigned a unique encrypted code which is associated with data maintained in the central control facility's computers. This data may include the type of bulb fitted and the location of the particular streetlight. The data may further include an instruction set as to what action to take when an encrypted code signal is received by the control facility. This could include a message to the maintenance department and even a requisition on a supplier of the required bulb so that a check of bulb stock and possible resupply will automatically follow.

Similarly, smoke alarms may incorporate an individual signal unit, with the smoke detector circuit providing an input to the signaling unit when smoke is detected. In this example power for the signaling unit may be provided in common with the smoke detector power supply.

In another example, individual signal units may be incorporated in parking meters, with sensing for example of coin full, out of paper or tampering conditions.

In a further example, as alluded to above, individual signal units provided with magnetic card readers as input attachments may be incorporated or attached at a number of locations within or on the outside of various buildings. Security personnel or cleaners may then swipe an appropriate card through the reader to trigger a signal to the central control facility, which then forwards notification to an appropriate nominated recipient that the building is secure or has been cleaned.

An individual signal unit may be installed in plant and commercial vehicles, monitoring for example power up and power down of an engine so as to track duty cycles, servicing intervals and improper use for example. In this example, the owner of the plant or vehicle can access the central control facility and obtain a record of the times the plant was in operation and log the hours of service.

In yet a further example, individual signal units with appropriate sensors may be located along rivers and streams to give early warning of changes in water levels.

Other areas of use include the monitoring of vending machines as to status of stock and tampering for example. Items of utility infrastructure, such as water and gas supply equipment also may be conveniently monitored for usage and error conditions.

In at least one embodiment of the invention, the action taken by the control facility may be predicated on a secondary layer of instructions received from the owner of the individual signal unit and the sensor or sensors attached to it. For example, the registration of the unit may include a number of optional actions for the control facility to implement after a first notification to the owner (or an authorized recipient designated by the registered owner) of an event.

For example, where the individual signal unit is monitoring the security of a site office or container at a building site, the possible actions to be taken by the central control facility may include:
 1. to ignore
 2. to call a contracted security firm
 3. to call the site foreman
 4. to call a neighbor
 5. to call the police The primary instructions on record at the control facility to be followed on receipt of a signal from the individual signal unit installed at the building site, is to send an SMS message to the owner or authorized recipient. He or she may respond for example with "34". The control facility will then carry out actions 3 and 4 of the possible actions of the secondary layer of instructions by notifying the site foreman (3) and the neighbor (4) of the event.

In a further example of use, as summarised in FIGS. 21 to 23, the ISU may be interfaced with the management computer of a private or commercial vehicle. This allows the management of many aspects of the vehicle, its running costs, performance as well as the scheduling of servicing and even the acquisition of service availability and quotations for service.

This application of the ISU is of particular use for operators of hire cars for example with an ISU as described above to provide any of the data transferable from a car's onboard computer. These may include the status of the vehicle's door locks at any given time, for example to indicate if it has been left unlocked while not in use.

In the case of loss of keys of any vehicle, the ISU could be instructed to lock and keep locked the doors of the vehicle until this command was reversed.

An in-vehicle ISU could be used to augment the entertainment system of the vehicle by accessing the internet via wireless broadband for downloading music and videos, accessing a remote computer and using the internet for surfing.

Still with reference to FIG. 22, the addition of suitable devices to the ISU could allow the remote immobilisation of a stolen vehicle, and activate various alarm and indicators that the vehicle is being interfered with.

Information extracted from the vehicle's onboard computer, if relayed to a designated repair centre when the vehicle suffers malfunction at some remote location, could be used by the repair centre to issue instructions for repairs.

FIG. 23 provides an overview of potential uses of an ISU installed in a vehicle and the actions which may follow on from the monitoring of the status, or measurement of various parameters associated with the vehicle's use and its equipment.

It will be appreciated that the individual signal unit and monitoring system described above provides an extremely flexible and effective way of disseminating an alert of an alarm generated by any of a range of events at widely dispersed locations to owners of the device and/or those service providers best able to deal effectively with the cause of the alarm, and allows a unit owner to specify the circumstances under which the owner is to be contacted actions taken.

The system provides:
Global machine to machine communication
Distance independence
Location independence
Mobility independence
5 minute DIY installation
An extraordinary number of marketable products.

The individual signal unit (ISU) system of the present invention provides a missing link people products and services.

With unlimited scope and versatility the ISU platform can receive information via any network and initiate a user-configured chain of events, anywhere in the world to anyone.

It is capable of bringing world-wide products and services to a centralised system for multiple uses and applications.

The small compact ISU (similar in size and appearance of a small MP3 player may be adapted to access advanced programming and resources with little or no setup.

Figure 29:
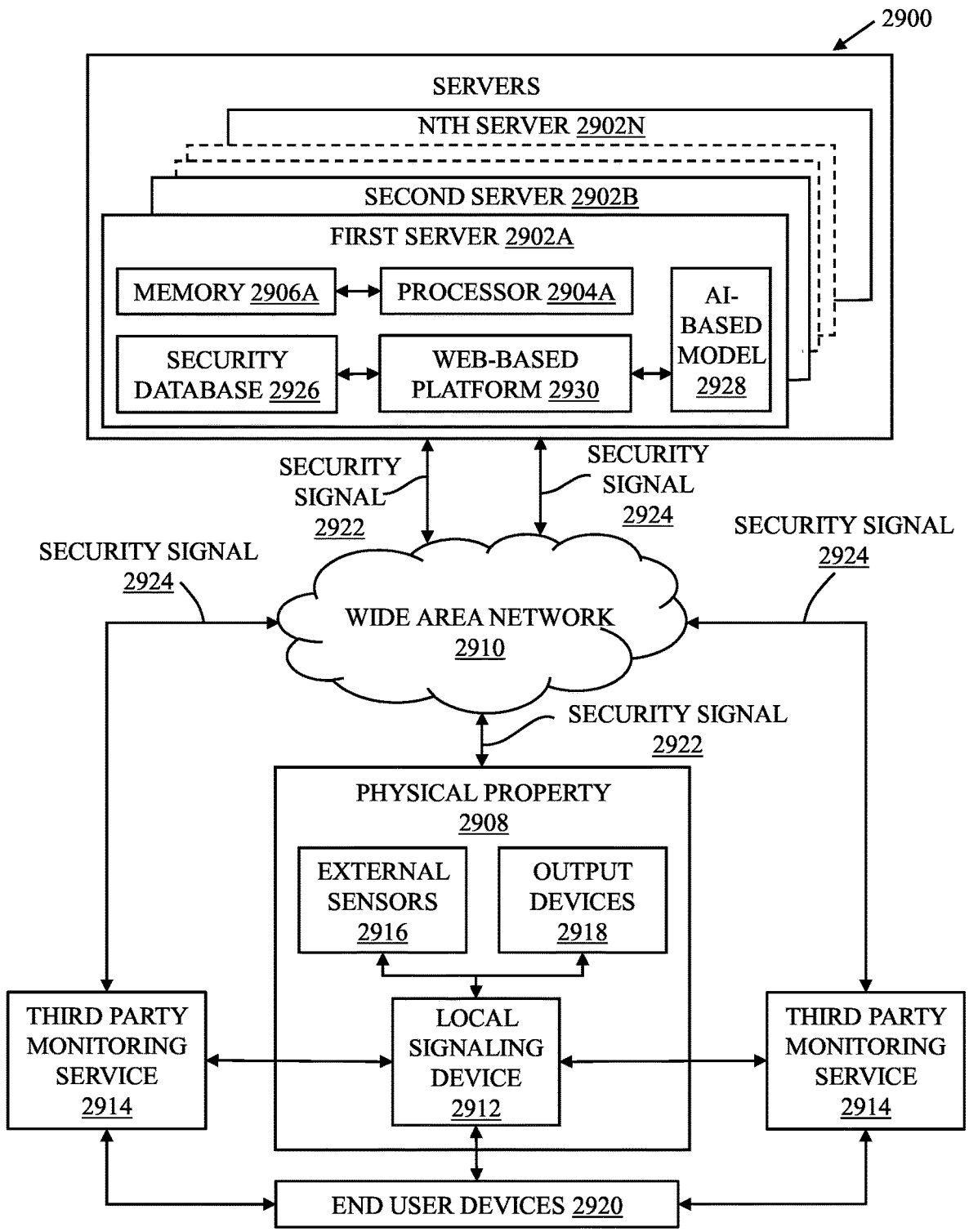
FIG. 29 is a block diagram of a system for providing property security in accordance with an embodiment of the present disclosure.

FIG. 29 is a block diagram of a system for property security in accordance with an embodiment of the present disclosure. With reference to FIG. 29, there is shown a block diagram of a system 2900. The system 2900 is used for providing property security. The system 2900 includes one or more servers 2902A to 2902N. Specifically, the one or more servers 2902A to 2902N includes a first server 2902A, a second server 2902B, and up to a Nth server 2902N. Each of the one or more servers 2902A to 2902N includes a processor coupled to an associated data memory. For example, the first server 2902A includes a processor 2904A and a memory 2906A. The processor 2904A is communicatively coupled with the memory 2906A. Further, the one or more servers 2902A to 2902N includes a security database 2926, and an artificial intelligence (AI)-based analysis model 2928. In an implementation, the one or more servers 2902A to 2902N further includes a web-based platform 2930 that is coupled to the security database 2926 and the artificial intelligence (AI)-based analysis model 2928.

In an implementation, the processor 2904A and the memory 2906A may be implemented on a same server, such as the first server 2902A. In some other implementations, the processor 2904A and the memory 2906A may be implemented on a different server. Further, in an implementation, the one or more servers 2902A to 2902N are communicatively coupled with at least one local signaling device 2912 associated with a physical property 2908, via the WAN 2910. The one or more servers 2902A to 2902N are further communicatively coupled with one or more third party monitoring services 2914, via the WAN 2910. In an implementation, the physical property 2908 includes one or more external sensors 2916 and one or more output devices 2918. In an implementation, the at least one local signaling device 2912 of the physical property 2908 is communicatively coupled to the one or more external sensors 2916 and the one or more output devices 2918.

Each of the one or more servers 2902A to 2902N includes suitable logic, circuitry, interfaces, and code that may be configured to communicate with the physical property 2908 and the one or more third party monitoring services 2914 via the WAN 2910. In an implementation, the one or more servers 2902A to 2902N may include a master server or a master machine that is a part of a data center that controls an array of other cloud servers communicatively coupled to it for load balancing, running customized applications, and efficient data management. Examples of the one or more servers 2902A to 2902N may include, but are not limited to, a cloud server, an application server, a data server, or an electronic data processing device.

The processor 2904A (as shown in FIG. 29) refers to a computational element that is operable to respond to and processes instructions that drive the system 2900. The processor 2904A may refer to one or more individual processors, processing devices, and various elements associated with a processing device that may be shared by other processing devices. Additionally, the one or more individual processors, processing devices, and elements are arranged in various architectures for responding to and processing the instructions that drive the system 2900. In some implementations, the processor 2904A may be an independent unit and may be located outside the server 2902A of the system 2900. Examples of the processor 2904A may include, but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The memory 2906A (as shown in FIG. 29) refers to a volatile or persistent medium, such as an electrical circuit, magnetic disk, virtual memory, or optical disk, in which a computer can store data or software for any duration. Optionally, the memory 2906A is a non-volatile mass storage, such as a physical storage media. The memory 2906A is configured to store a set of predefined steps. Furthermore, in an example scenario, the system 2900 is implemented in a spatially distributed manner; optionally, the processor 2904A, the memory 2906A and/or storage capability may be distributed as well. Examples of implementation of the memory 2906A may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The physical property 2908 refers to a piece of real estate or property that has physical dimensions and may be located at a specific geographic location. The physical property 2908 may include, but not limited to, a building, a plot of land, or any other tangible asset that can be bought, sold, or rented.

The WAN 2910 includes a medium (e.g., a communication channel) through which the physical property 2908 and the one or more third party monitoring services 2914 communicates with the one or more servers 2902A to 2902N. The WAN 2910 may be a wired or wireless communication network. Examples of the WAN 2910 may include, but are not limited to, Internet, a wireless wide area network (WWAN), a cloud network, a Long-Term Evolution (LTE) network, a plain old telephone service (POTS), a Metropolitan Area Network (MAN), and/or the Internet. In an implementation, the WAN 2910 is a cellular network.

The at least one local signaling device 2912 refers to a device that is capable of emitting, when in use, an audible, visual, or other sensory signal to indicate a particular status or event. The local signaling device 2912 is a hub communication device that is communicatively coupled to one or more external sensors 2916 and output devices 2918 in or around the physical property 2908. For example, the local signaling device 2912 may be used to control and monitor various devices in a home, such as smart lights, thermostats, and security cameras. The local signaling device 2912 may be connected to a sensor or other monitoring device, and may be configured to emit a signal based on data received from the sensor or in case of a security event occurring. The signal may be audible, visual, or a combination of both, and may be designed to alert nearby individuals to the status or event being signaled. In some implementations, the at least one local signaling device 2912 is substantially similar to the individual signal unit 22 of FIGS. 1 to 3.

The one or more third party monitoring services 2914 refer to external services that may monitor the status and performance of the local signaling device 2912 remotely. The one or more third party monitoring services 2914 may be provided by third-party companies that specialize in monitoring specific types of systems, such as security or environmental monitoring systems. Examples of the one or more third-party monitoring services 2914 include cloud-based monitoring services, remote monitoring and management services, and security monitoring services. The one or more third party monitoring services 2914 may provide real-time alerts, analytics, and reporting to help users monitor and manage their systems more effectively. The real-time alerts, analytics, and reporting refer to the capability of a system or software to provide immediate notifications, or notifications with minimal delay based on real-time data. This data may be analyzed and presented in various formats to provide insights into the performance or behavior of a system or process. The real-time alerts may be triggered by certain events, such as a sudden increase in temperature or a motion detected by a sensor. In an implementation, the one or more third party monitoring services 2914 are configured to generate a security signal 2924 upon triggering the real-time alerts.

The one or more external sensors 2916 refer to any sensor that is capable of detecting potential security breaches in or around the physical property 2908 as part of a property security system. Some examples of the one or more external sensors 2916 are motion detectors, door and window sensors, glass break detectors, smoke detectors, carbon monoxide detectors, flood sensors, and temperature sensors. Further, the one or more external sensors 2916 are configured to generate a security signal 2922 upon detection of any potential security breach.

The one or more output devices 2918 refer to any devices that may receive and display information or data generated by the one or more external sensors 2916. Some examples of the one or more output devices 2918 are sirens and alarms, strobe lights, voice speakers or intercoms, video cameras and displays, smart locks or access control systems, and automated gates or barriers. However, in some implementations, the one or more external sensors 2916 and the one or more output devices 2918 may include any other types of sensors and output devices that may be used depending on the specific needs and characteristics of the physical property 2908 being secured.

The one or more end-user devices 2920 refers to any mobile computing device such as smartphone, laptop, etc. The one or more end-user devices 2920 is configured to display data related to security events.

The security database 2926 refers to a database that stores the security signals 2922 and 2924 and other data associated with a plurality of security events of the local signaling device 2912 and other local signaling devices in corresponding private data silos unexposed to one or more administrators of the one or more servers 2902A to 2902N. The plurality of security events may include, but not limited to, unauthorized access attempts, motion detection, fire or smoke detection, and other security-related events. The security signals 2922 and 2924 may include data indicative of specific types of security events or alerts that are generated by the local signaling device 2912 and stored in the security database 2926 for analysis and reporting.

The AI-based analysis model 2928 refers to a machine learning model that is trained to analyze and process security signals, other data related to security events, supplementary insights, and security patterns. The AI-based analysis model 2928 may use advanced algorithms and statistical techniques to identify patterns, anomalies, and potential threats in real-time. Once trained, the AI-based analysis model 2928 may be used to automatically analyze incoming security signals and provide alerts or take action to mitigate security risks.

The web-based platform 2930 refers to a software platform or application that is accessible through a web browser or web interface. The web-based platform 2930 is used to provide access to the security database 2926 and the AI-based analysis model 2928, and also includes the functionality to provide access provisioning control to a data owner.

In operation, the one or more servers 2902A to 2902N are configured to communicate in real time or near real-time over a Wide Area Network 2910 with the at least one local signaling device 2912 associated with the physical property 2908. The real-time or near real-time communication refers to a type of data exchange in which there is an immediate or almost immediate response or feedback loop between the sender and the receiver of the data. This means that the communication happens instantaneously or with minimal delay, so that the participants can interact and respond to each other in a timely manner. The real-time or near real-time communication is commonly used in various applications such as video conferencing, instant messaging, voice over IP (VoIP), and online gaming, among others. The real-time or near real-time communication is important in many scenarios where immediate response and interaction is necessary, such as emergency situations, critical business decisions, collaborative work environments, and security breaches.

The one or more servers 2902A to 2902N are further configured to register the at least one local signaling device 2912 associated with the physical property 2908 to utilize functions provided by the one or more third party monitoring services 2914 that are communicatively coupled to the at least one local signaling device 2912. The registration includes configuring, at least in part, through user data entry into a web-based interface, a set of predefined steps to be taken by the one or more servers 2902A to 2902N in connection with one or more of the functions provided by the one or more third party monitoring services 2914. Some examples of the set of predefined steps may include sending alerts or notifications to designated individuals or groups based on specific triggers or events detected by the sensors, or automatically adjusting security settings or behavior in response to certain external factors. The predefined steps may also involve recording and storing data from the sensors for later analysis and use in improving system performance or decision-making.

The one or more servers 2902A to 2902N are further configured to receive the security signal 2922 from the at least one local signaling device 2912. The security signal includes two or more of: a type of security event, a location of the security event, and a severity of the security event. In an implementation, the one or more servers 2902A to 2902N are further configured to receive the security signal 2924 from the one or more third-party monitoring services 2914.

The one or more servers 2902A to 2902N are further configured to, in response to receiving the security signal 2922, execute at least one of the set of predefined steps. The execution includes communicating instructions to the one or more third party monitoring services 2914 mapped to one or more end user devices 2920. In some implementations, in response to receiving the other security signal 2924, there is executed at least one additional predefined step. The execution includes providing an alert to the one or more end-user devices 2920 associated with the physical property 2908 or one or more authorized third parties indicating that the security event has been confirmed by the one or more third-party monitoring services 2914. In some implementations, the set of predefined steps to be taken by the one or more servers 2902A to 2902N is provided or selectable from the local signaling device 2912 or the one or more end-user devices 2920 communicatively coupled to the at least one local signaling device 2912.

In an implementation, the one or more servers 2902A to 2902N are further configured to acquire sensor data from the one or more external sensors 2916 and output devices 2918 communicatively coupled to the local signaling device 2912. In some implementations, the one or more servers 2902A to 2902N are further configured to recommend an actionable insight indicative of an immediate action to be taken when a fault in the one or more external sensors 2916 and output devices 2918 communicatively coupled to the local signaling device 2912 is detected.

In an implementation, the one or more servers 2902A to 2902N are further configured to acquire the type of security event, the location of the security event, and the severity of the security event from the local signaling device 2912 in the real-time or near real-time when the local signaling device 2912 detects the security event classified as being a potential security breach and generates the security signal 2922 upon detection of said potential security breach.

In an implementation, the one or more servers 2902A to 2902N are further configured to determine a plurality of supplementary insights and a plurality of security patterns from the security signal 2922 and the other data related to the plurality of security events. In some implementations, the one or more servers 2902A to 2902N are further configured to train the AI-based analysis model 2928 from the security signal 2922, the other data being related to the plurality of security events, the plurality of supplementary insights, and the plurality of security patterns. In some other implementations, the one or more servers 2902A to 2902N may be further configured to train the AI-based analysis model 2928 from the security signal 2924 or from both the security signals 2922 and 2924. In another implementation, the one or more servers 2902A to 2902N are further configured to provide an access provisioning control to a data owner such that an access control is provisioned or denied to another entity only by the data owner without exposing data associated the data owner to other users including one or more administrators of the web-based platform 2930.

In an implementation, the AI-based analysis model 2928 is configured to analyze the security signal 2922 and other data associated with the plurality of security events of the local signaling device 2912 and other local signaling devices stored in the security database 2926 to identify patterns or anomalies associated with the plurality of security events, and to generate alerts or recommendations based on the analysis.

Figure 30:
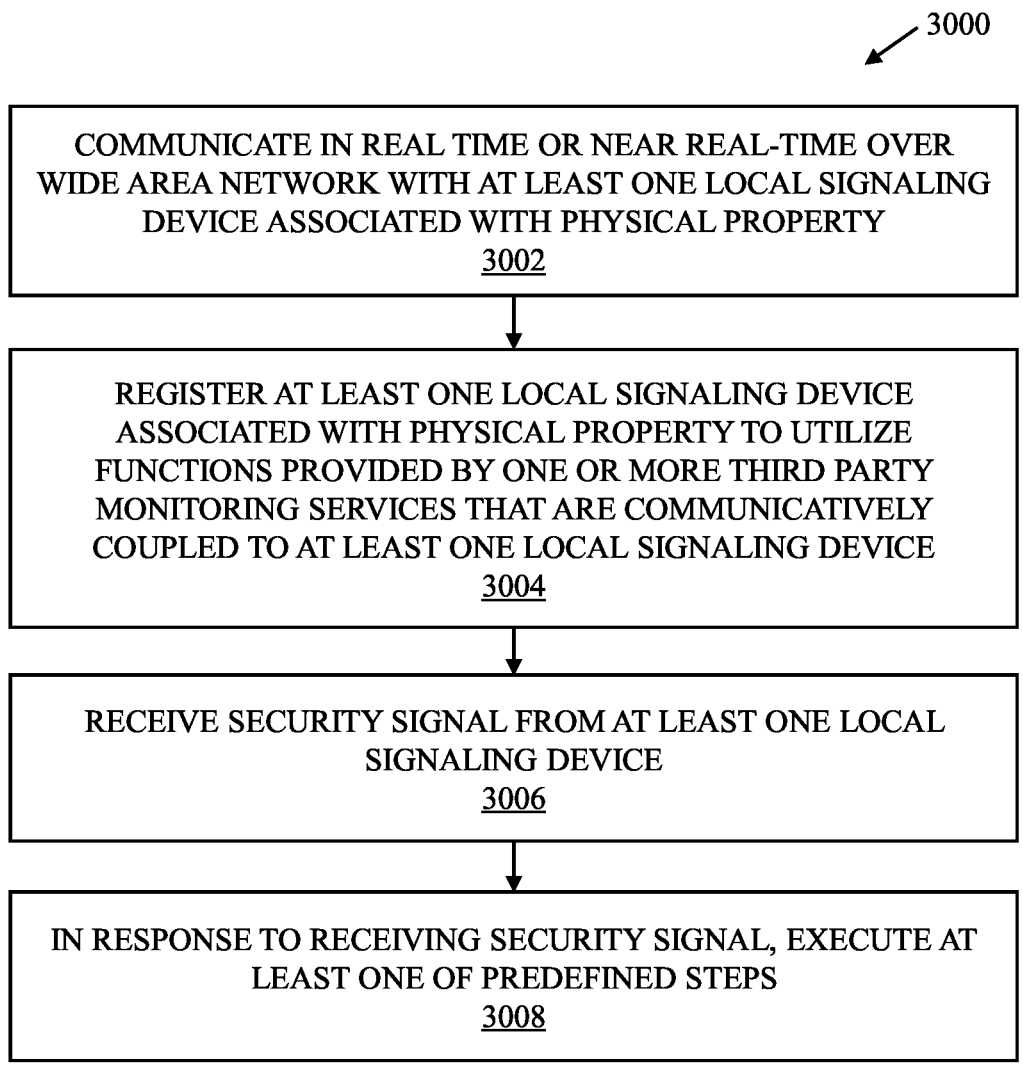
FIG. 30 is a flowchart of a method for providing property security in accordance with an embodiment of the present disclosure.

FIG. 30 is a flowchart of a method for providing property security, in accordance with an embodiment of the present disclosure. In the following description, FIG. 30 is explained in conjunction with elements from FIG. 29. With reference to FIG. 30, there is shown a flowchart of a method 3000. The method 3000 includes configuring the one or more servers 2902A to 2902N (of FIG. 29) to execute the method 3000. The method 3000 includes steps 3002 to 3004.

At the step 3002, the method 3000 includes communicating in real time or near real-time over the WAN 2910 with the at least one local signaling device 2912 associated with the physical property 2908.

At the step 3004, the method 3000 further includes registering the at least one local signaling device 2912 associated with the physical property 2908 to utilize functions provided by the one or more third party monitoring services 2914 that are communicatively coupled to the at least one local signaling device 2912. The registration includes configuring, at least in part, through user data entry into the web-based interface, the set of predefined steps to be taken by the one or more servers 2902A to 2092N in connection with one or more of the functions provided by the the one or more third party monitoring services 2914.

At the step 3006, the method 3000 further includes receiving the security signal 2922 from the at least one local signaling device 2912. The security signal 2912 includes two or more of: the type of security event, the location of the security event, and the severity of the security event.

At the step 3008, the method 3000 includes, in response to receiving the security signal 2922, executing at least one of the set of predefined steps. The execution includes communicating instructions to the one or more third party monitoring services 2914 mapped to the one or more end user devices 2920.

In accordance with an embodiment, the method 3000 further includes storing, by the one or more servers 2902A to 2902N, the security signal 2922 and other data associated with the plurality of security events of the local signaling device 2912 and other local signaling devices in the security database 2926 that stores the security signal 2922 and other data associated with the plurality of security events of the local signaling device 2912 and other local signaling devices in the corresponding private data silos unexposed to the one or more administrators of the one or more servers 2902A to 2902N.

In accordance with an embodiment, the method 3000 further includes training, by the one or more servers 2902A to 2902N, the AI-based analysis model 2928 from the security signal 2922, the other data related to the plurality of security events, the plurality of supplementary insights, and the plurality of security patterns.

Referring to FIGS. 29 and 30, the system 2900 and the method 3000 may enhance security by providing real-time monitoring of the security signals 2922 and 2924 from various sensors and devices and analyzing the security signals 2922 and 2924 using the AI-based analysis model 2928. Thus, the system 2900 and the method 3000 may allow for the detection of security threats and events more quickly and accurately than traditional known security systems. The system 2900 and the method 3000 may improve access control by allowing data owners to provision or deny access control to other entities without exposing their data to other users, including administrators of the web-based platform 2930. The system 2900 and the method 3000 may be scalable and able to handle large amounts of data from multiple sensors and devices. The use of private data silos for each local signaling device (similar to the local signaling device 2912) may also increase scalability by preventing data overload. The system 2900 and the method 3000 may provide customizable insights based on the specific needs and preferences of the user. The plurality of supplementary insights and security patterns may allow for the generation of unique insights tailored to the user's needs. The use of private data silos for each local signaling device may help ensure data privacy by keeping data associated with a specific device or user separate from other users and administrators of the web-based platform 2930.

The above describes only some embodiments of the present invention and modifications, obvious to those skilled in the art, can be made thereto without departing from the scope and spirit of the present invention.

What is claimed is:

1. A system for providing property security, the system comprising:
   one or more servers configured to:
   communicate in real time or near real-time over a Wide Area Network with at least one local signaling device associated with a physical property;
   register said at least one local signaling device associated with the physical property to utilize functions provided by one or more third party monitoring services that are communicatively coupled to said at least one local signaling device,
   said registration comprising configuring, at least in part, through user data entry into a web-based interface, a set of predefined steps to be taken by said one or more servers in connection with one or more of the functions provided by said one or more third party monitoring services;
   receive a security signal from said at least one local signaling device, wherein said security signal comprises two or more of: a type of security event, a location of the security event, and a severity of the security event; and
   in response to receiving said security signal, execute at least one of said predefined steps, wherein said execution includes communicating instructions to said one or more third party monitoring services mapped to one or more end-user devices,
   wherein the one or more servers include at least a security database and a web-based platform coupled to said security database and to an artificial intelligence-based analysis model trained on said one or more servers, wherein the one or more servers are configured to provide an access provisioning control to a data owner such that an access control is provisioned or denied to another entity only by the data owner without exposing data associated the data owner to other users including one or more administrators of the web-based platform.

2. The system of claim 1, wherein said local signaling device is a hub communication device that is communicatively coupled to one or more external sensors and output devices in or around the physical property, and wherein the one or more servers are configured to acquire sensor data from one or more external sensors and output devices communicatively coupled to said local signaling device.

3. The system of claim 2, wherein said one or more servers are further configured to recommend an actionable insight indicative of an immediate action to be taken when a fault in said one or more external sensors and output devices communicatively coupled to said local signaling device is detected.

4. The system of claim 1, wherein the one or more servers are further configured to acquire the type of security event, the location of the security event, and the severity of the security event from said local signaling device in a real-time or near real-time when said local signaling device detects a security event classified as a potential security breach and generates said security signal upon detection of said potential security breach.

5. The system of claim 1, wherein the set of predefined steps to be taken by said one or more servers is provided or selectable from said local signaling device or a user device communicatively coupled to said at least one local signaling device.

6. The system of claim 1, wherein said Wide Area Network is a cellular network.

7. The system of claim 1, wherein said one or more servers is further configured to receive another security signal from said one or more third-party monitoring services and, in response to receiving said other security signal, execute at least one additional predefined step, wherein said execution comprises providing an alert to one or more end-user devices associated with the physical property or one or more authorized third parties indicating that the security event has been confirmed by the one or more third-party monitoring services.

8. The system of claim 1, wherein the security database is configured to store said security signal and other data associated with a plurality of security events of said local signaling device and other local signaling devices in corresponding private data silos unexposed to one or more administrators of the one or more servers.

9. The system of claim 8, wherein the one or more servers are further configured to determine a plurality of supplementary insights and a plurality of security patterns from said security signal and said other data related to the plurality of security events.

10. The system of claim 8, wherein the artificial intelligence-based analysis model is trained on the one or more servers from said security signal, said other data related to the plurality of security events, said plurality of supplementary insights, and said plurality of security patterns.

11. The system of claim 1, wherein the artificial intelligence-based analysis model is configured to analyze said security signal and other data associated with the plurality of security events of said local signaling device and other local signaling devices stored in the security database to identify patterns or anomalies associated with the plurality of security events, and to generate alerts or recommendations based on the analysis.

12. A method for using a system to provide property security, wherein the method comprises:
   configuring one or more servers to provide access provisioning control to a data owner such that access control is provisioned or denied to a separate entity only by the data owner without exposure of data associated with the data owner to other users and to:
   communicate in real time or near real-time over a Wide Area Network with at least one local signaling device associated with a physical property;
   register said at least one local signaling device associated with the physical property to utilize functions provided by one or more third party monitoring services that are communicatively coupled to said at least one local signaling device, said registration comprising configuring, at least in part, through user data entry into a web-based interface, a set of predefined steps to be taken by said one or more servers in connection with one or more of the functions provided by said one or more third party monitoring services;

receive a security signal from said at least one local signaling device, wherein said security signal comprises two or more of: a type of security event, a location of the security event, and a severity of the security event; and in response to receiving said security signal, execute at least one of said predefined steps, wherein said execution includes communicating instructions to said one or more third party monitoring services mapped to one or more end-user devices.

13. The method of claim 12, further comprising storing, by the one or more servers, said security signal and other data associated with a plurality of security events of said local signaling device and other local signaling devices in a security database that stores said security signal and other data associated with the plurality of security events of said local signaling device and other local signaling devices in corresponding private data silos unexposed to one or more administrators of the one or more servers.

14. The method of claim 12, further comprising training, by the one or more servers, an artificial intelligence-based analysis model from said security signal, said other data related to the plurality of security events, said plurality of supplementary insights, and said plurality of security patterns.

* * * * *